(12) United States Patent
Winfield et al.

(10) Patent No.: US 12,502,557 B2
(45) Date of Patent: Dec. 23, 2025

(54) RADIOTHERAPY DEVICES AND ACCESS AUTHORISATION

(71) Applicant: Elekta Limited, Crawley (GB)

(72) Inventors: Colin Winfield, Crawley (GB); Marco Massai, Crawley (GB); Neil Pritchard, Crawley (GB); Paul Boxall, Crawley (GB)

(73) Assignee: Elekta Limited, Crawley (GB)

( * ) Notice: Subject to any disclaimer, the term of this patent is extended or adjusted under 35 U.S.C. 154(b) by 507 days.

(21) Appl. No.: 17/594,654

(22) PCT Filed: Apr. 23, 2020

(86) PCT No.: PCT/EP2020/061390
§ 371 (c)(1),
(2) Date: Oct. 25, 2021

(87) PCT Pub. No.: WO2020/216866
PCT Pub. Date: Oct. 29, 2020

(65) Prior Publication Data
US 2022/0088415 A1    Mar. 24, 2022

(30) Foreign Application Priority Data
Apr. 25, 2019 (GB) .................................... 1905783

(51) Int. Cl.
*A61N 5/10*   (2006.01)
*A61B 90/98*  (2016.01)

(52) U.S. Cl.
CPC ............ *A61N 5/1075* (2013.01); *A61B 90/98* (2016.02); *A61N 2005/1074* (2013.01)

(58) Field of Classification Search
CPC .......... A61N 5/1075; A61N 2005/1074; A61B 90/98; H01J 3/028; G16H 40/40
See application file for complete search history.

(56) References Cited

U.S. PATENT DOCUMENTS 5,041,789 A * 8/1991 Keller .................... G01R 33/28
                                                              324/318
5,260,581 A   11/1993 Lesyna et al.
(Continued)

FOREIGN PATENT DOCUMENTS

DE   102018204815 A1   5/2018
EP        1454657 A2   9/2004
(Continued)

OTHER PUBLICATIONS

"International Application Serial No. PCT/EP2020/061390, International Search Report dated Jul. 31, 2020", (Jul. 31, 2020), 8 pgs.
(Continued)

*Primary Examiner* — Daniel I Walsh
(74) *Attorney, Agent, or Firm* — Schwegman Lundberg & Woessner, P.A.

(57) ABSTRACT

A method of determining whether a radiotherapy device configured to provide therapeutic radiation to a patient should be authorised for use. The device comprises a plurality of components, each component of the plurality of components being coupled with at least one identifier configured to provide data identifying the component it is coupled with. The method comprises receiving, from the identifiers, data identifying each of the plurality of components of the radiotherapy device and determining whether at least one authorisation criterion is met based on the identifying data and authorisation data; and if the at least one authorisation criterion is met, determining that the radiotherapy device is authorised for use.

18 Claims, 6 Drawing Sheets

(56) References Cited

U.S. PATENT DOCUMENTS

| | | | |
|---|---|---|---|
| 6,085,154 A * | 7/2000 | Leuthausser | G07C 5/00 702/182 |
| 7,345,292 B2 | 3/2008 | Moriyama et al. | |
| 8,560,160 B2 * | 10/2013 | Holzer | G05B 19/4184 429/143 |
| 9,618,461 B2 * | 4/2017 | Ohara | G01T 7/00 |
| 10,204,245 B1 | 2/2019 | Diorio et al. | |
| 10,327,730 B2 * | 6/2019 | Meiler | A61B 6/4494 |
| 10,898,734 B2 * | 1/2021 | Taminiau | A61N 5/1081 |
| 2003/0097229 A1 | 5/2003 | Herrmann et al. | |
| 2005/0035861 A1 | 2/2005 | Gliessmann et al. | |
| 2006/0129140 A1 * | 6/2006 | Todd | A61B 90/98 606/1 |
| 2007/0257800 A1 * | 11/2007 | Yang | G06K 19/073 343/841 |
| 2008/0128492 A1 | 6/2008 | Roth et al. | |
| 2008/0184330 A1 | 7/2008 | Lal et al. | |
| 2008/0191009 A1 * | 8/2008 | Gressel | H04W 4/021 235/382 |
| 2008/0230608 A1 * | 9/2008 | Lallemang | G06K 17/00 235/449 |
| 2009/0171184 A1 * | 7/2009 | Jenkins | A61B 34/10 606/130 |
| 2011/0301671 A1 | 12/2011 | Lytle et al. | |
| 2014/0055148 A1 * | 2/2014 | Biber | G01R 27/28 324/629 |
| 2014/0084058 A1 * | 3/2014 | Barry | G16H 20/40 235/380 |
| 2014/0221815 A1 * | 8/2014 | Aklan | A61B 5/055 600/411 |
| 2014/0341351 A1 * | 11/2014 | Berwick | A61N 5/1045 378/65 |
| 2015/0130593 A1 * | 5/2015 | Mats | G06K 7/0008 340/10.1 |
| 2016/0047872 A1 * | 2/2016 | Park | G01R 33/4818 324/309 |
| 2016/0321422 A1 | 11/2016 | Albright | |
| 2017/0359101 A1 * | 12/2017 | Sabacinski | H02J 50/12 |
| 2019/0006039 A1 | 1/2019 | Ali | |
| 2019/0012479 A1 * | 1/2019 | Diaz Carmena | G06F 21/6245 |
| 2020/0345437 A1 * | 11/2020 | Rosa | A61B 90/08 |
| 2021/0050099 A1 * | 2/2021 | Kirshenbaum | G16H 40/60 |
| 2021/0050102 A1 * | 2/2021 | Avraham | G16H 40/20 |
| 2021/0092823 A1 * | 3/2021 | Koba | H01J 35/025 |
| 2022/0088415 A1 * | 3/2022 | Winfield | A61B 90/98 |
| 2022/0375709 A1 * | 11/2022 | Allen | H05B 6/666 |
| 2023/0280288 A1 * | 9/2023 | An | H04N 25/779 378/59 |
| 2023/0307117 A1 * | 9/2023 | Kumar | G16H 40/67 |
| 2024/0080963 A1 * | 3/2024 | Takanaka | H05G 1/54 |
| 2024/0206044 A1 * | 6/2024 | Pronk | A61B 6/586 |
| 2024/0233931 A1 * | 7/2024 | Dinh | G16H 40/40 |
| 2024/0422887 A1 * | 12/2024 | Vogtmeier | G16H 40/20 |
| 2025/0024577 A1 * | 1/2025 | Korst | A61B 6/586 |

FOREIGN PATENT DOCUMENTS

| | | |
|---|---|---|
| EP | 1815379 B1 | 10/2018 |
| JP | 2002222200 A | 8/2002 |
| WO | WO-2016209858 A1 | 12/2016 |

OTHER PUBLICATIONS

"International Application Serial No. PCT/EP2020/061390, Written Opinion dated Jul. 31, 2020", (Jul. 31, 2020), 11 pgs.

"United Kingdom Application Serial No. GB1905783.5, Search & Examination Report dated Oct. 10, 2019", (Oct. 10, 2019), 9 pgs.

"Chinese Application Serial No. 202080046249.X, Office Action dated Dec. 23, 2023", w English Translation, (Dec. 23, 2023), 18 pgs.

"Australian Application No. 2020261247, Examination Report dated Sep. 2, 2025", (Sep. 2, 2025), 5 pgs.

* cited by examiner

RADIOTHERAPY DEVICES AND ACCESS AUTHORISATION

PRIORITY APPLICATIONS

This application is a U.S. National Stage Filing under 35 U.S.C. § 371 from International Application No. PCT/EP2020/061390, filed on Apr. 23, 2020, and published as WO2020/216866 on Oct. 29, 2020, which claims the benefit of priority to United Kingdom Application No. 1905783.5, filed on Apr. 25, 2019; the benefit of priority of each of which is hereby claimed herein, and which applications and publication are hereby incorporated herein by reference in their entireties.

This disclosure relates to radiotherapy devices. In particular, the disclosure relates to the automatic identification of radiotherapy device components, and to ensuring a field service engineer attending a radiotherapy device is properly authorised.

BACKGROUND

Radiotherapy devices are an important tool in modern cancer treatment. Radiotherapy devices are large, complex machines, with many moving parts and inter-operating mechanisms. Despite precision engineering and rigorous testing, some component parts of a radiotherapy machines may start to degrade over the lifetime of the machine. Radiotherapy devices therefore require servicing and maintenance to ensure they continue to operate in an optimal manner and to ensure the machines meet safety and regulatory requirements.

It is desirable to ensure that a radiotherapy device is comprised of components which have been tested and deemed safe for use with that device, and which have been properly authorised for use with that device. This allows manufacturers and owners of radiotherapy devices to ensure that their devices continue to meet safety standards, regulatory requirements, and continue to operate in an optimal manner.

Current processes are burdensome on field-service engineers and, while safety checks are in place, still allow for the possibility of human error to prolong the servicing and repair procedure of a radiotherapy device.

A further issue associated with prior arrangements is that there are no mechanisms in place which prevent unauthorised engineers from servicing and attempting to repair the radiotherapy devices. Often, unauthorised personnel do not have the necessary knowledge and experience to properly repair the radiotherapy device in a manner which ensures the device is still able to operate within safety and regulatory requirements.

It is also desirable to ensure that only properly authorised persons can install, repair, and/or service radiotherapy machines. This helps to maximise the likelihood that the device will continue to operate in accordance with safety and regulatory requirements.

The present disclosure seeks to address these and other disadvantages encountered in the prior art by providing a method of determining whether a radiotherapy device should be authorised for use, and a method of determining whether a service engineer is authorised to service a particular radiotherapy device.

SUMMARY

Aspects of the invention are set out in the independent claims. Optional features are set out in the dependent claims.

FIGURES

Specific embodiments are now described, by way of example only, with reference to the drawings, in which.

DETAILED DESCRIPTION

The present application relates generally to ensuring a safety criterion, or safety criteria, are met by comparing identifying data relating to various components of a radiotherapy machine with authorisation data stored in an authorisation database. Each component is coupled with, e.g. connected with, an identifier such as an RFID tag which is able to provide identifying information regarding the component it is coupled with. If the safety criterion, or safety criteria, are met, the radiotherapy device is authorised for use. The radiotherapy device or devices may comprise any of a linear accelerator (linac), an MRI machine, and an MR linac.

Figure 1:
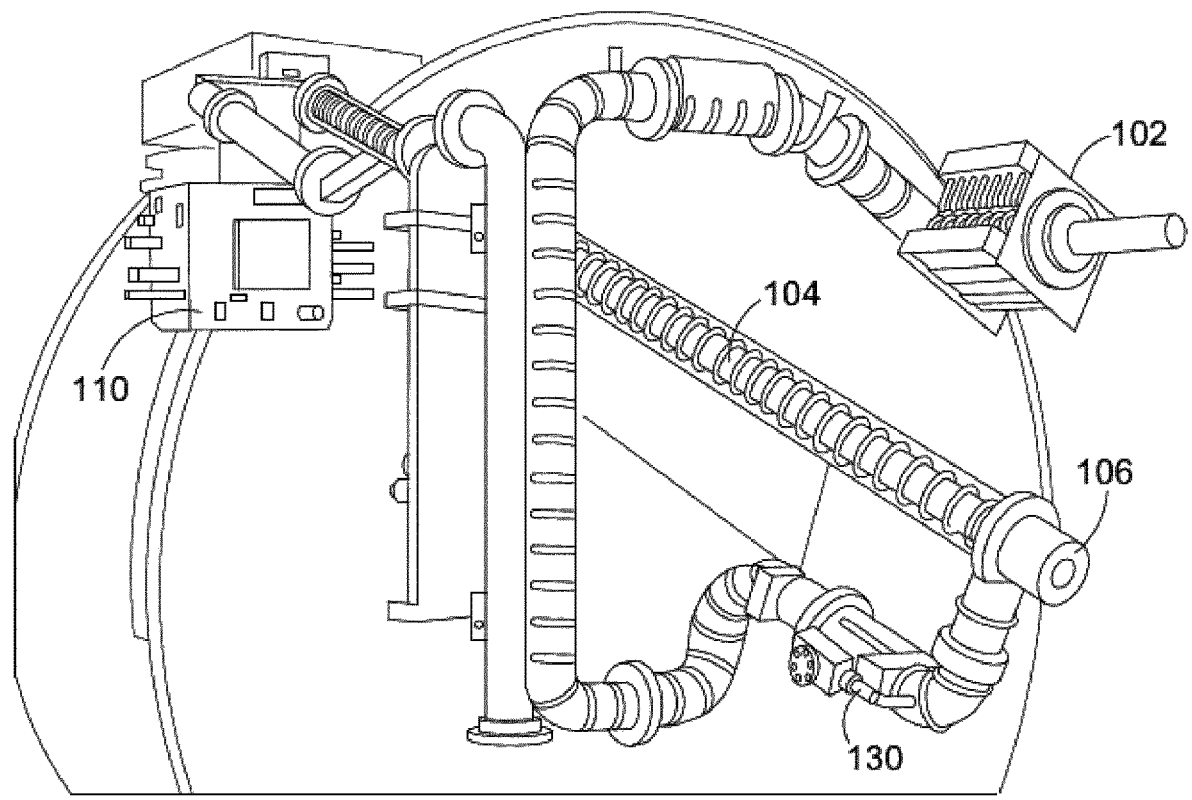
FIG. 1 depicts a radiotherapy device which may be used in systems and methods according to the present disclosure.

FIG. 1 depicts a linac which may form part of a system according to the present disclosure. The linac is suitable for delivering, and configured to deliver, a beam of radiation to a patient during radiotherapy treatment. In operation, the linac device produces and shapes a beam of radiation and directs it toward a target region within the patient's body in accordance with a radiotherapy treatment plan.

A medical linac machine is by necessity complex, with many inter-operating component parts. A brief summary of the operation of a typical linac will be given with respect to the linac device depicted in FIG. 1, which comprises a source of radiofrequency waves, a waveguide, a source of electrons, a system capable of creating a strong vacuum comprising one or more vacuum pumps, a heavy metal target which produces X-rays when hit by an electron beam, and a complex arrangement of magnets capable of redirecting and focusing the electron beam onto the target. The device depicted in FIG. 1 also comprises a treatment head which houses various apparatus configured to, for example, collimate and shape the resultant X-ray beam.

The source 102 of radiofrequency waves, such as a magnetron, produces radiofrequency waves. The source 102 of radiofrequency waves is coupled to the waveguide 104, for example via a circulator, and is configured to pulse radiofrequency waves into the waveguide 104. Radiofrequency waves pass from the source 102 of radiofrequency waves through an RF input window and into a RF input connecting pipe or tube. A source 106 of electrons, such as an electron gun, is coupled to the waveguide 104 and is configured to inject electrons into the waveguide 104. In the source 106 of electrons, electrons are thermionically emitted from a cathode filament as the filament is heated. The temperature of the filament controls the number of electrons injected. The injection of electrons into the waveguide 104 is synchronised with the pumping of the radiofrequency waves into the waveguide 104. The design and operation of the radiofrequency wave source 102, electron source 106 and the waveguide 104 is such that the radiofrequency waves accelerate the electrons to very high energies as they propagate through the waveguide 104.

The design of the waveguide 104 depends on whether the linac accelerates the electrons using a standing wave or travelling wave, though the waveguide typically comprises a series of cells or cavities, each cavity connected by a hole or 'iris' through which the electron beam may pass. The cavities are coupled in order that a suitable electric field pattern is produced which accelerates electrons propagating through the waveguide 104. As the electrons are accelerated in the waveguide 104, the electron beam path is controlled by a suitable arrangement of steering magnets, or steering coils, which surround the waveguide 104. The arrangement of steering magnets may comprise, for example, two sets of quadrupole magnets.

Once the electrons have been accelerated, they may pass into a flight tube. The flight tube may be connected to the waveguide by a connecting tube. This connecting tube or connecting structure may be called a drift tube. The drift tube also forms part of the vacuum tube. RF waves exit the waveguide via an RF output connecting pipe or tube coupled with the drift tube. RF passes out from the vacuum system via an RF output window which seals the vacuum system.

The flight tube is also kept under vacuum conditions by the pump system. The electrons may travel along a slalom path toward the heavy metal target. The target may comprise, for example, tungsten. Whilst the electrons travel through the flight tube, an arrangement of focusing magnets act to direct and focus the beam on the target. The slalom path allows the overall length of the LINAC to be reduced while ensuring that the beam of accelerated electrons, which is comprised of electrons with a small spread of energies, is focused on the target.

To ensure that propagation of the electrons is not impeded as the electron beam travels toward the target, the waveguide 104 is evacuated using a vacuum system comprising a vacuum pump 130 or an arrangement of vacuum pumps. The pump system is capable of producing ultra-high vacuum (UHV) conditions in the waveguide 104 and in the flight tube.

When the high energy electrons hit the target, X-rays are produced in a variety of directions. The target is located inside the flight tube, and is located at the end of the flight tube to seal the vacuum system. The flight tube also comprises a target window, which is transparent to X-rays, which is positioned to allow the X-rays which are produced when the linac is in operation to pass from the evacuated flight tube through the target window and into the treatment head 110. At this point, a primary collimator blocks X-rays travelling in certain directions and passes only forward travelling X-rays to produce a cone shaped beam. The X-rays are filtered, and then pass through one or more ion chambers for dose measuring. The beam can be shaped in various ways by beam-shaping apparatus, for example by using a multi-leaf collimator, before it passes into the patient as part of radiotherapy treatment.

In some implementations, the linac is configured to emit either an X-ray beam or an electron particle beam. Such implementations allow the device to provide electron beam therapy, i.e. a type of external beam therapy where electrons, rather than X-rays, are directed toward the target region. It is possible to 'swap' between a first mode in which X-rays are emitted and a second mode in which electrons are emitted by adjusting the components of the linac. In essence, it is possible to swap between the first and second mode by moving the heavy metal target in or out of the electron beam path and replacing it with a so-called 'electron window'. The electron window is substantially transparent to electrons and allows electrons to exit the flight tube.

The end of the flight tube may be sealed by a component which comprises both a target and an electron window. It is then possible to swap between the first and second mode by moving the flight tube such that the electron beam points toward either the target or the electron window. The drift tube, which connects the waveguide to the start of the flight tube, is therefore slightly flexible to allow the flight tube to move. In other words, the flight tube will move when the user changes between using an electron and x-ray energy, this puts either the tungsten target (x-ray) or electron window (electron) in position to treat.

The linac device also comprises several other components and systems. The whole system is cooled by a water cooling system (not shown in the figures). The water cooling system may be used, in particular, to cool the waveguide 104, target, and radiofrequency source 102. In order to ensure the linac does not leak radiation, appropriate shielding is also provided. As will be understood by the person skilled in the art, a linac device used for radiotherapy treatment will have additional apparatus such as a gantry to support and rotate the linac treatment head/source of radiation, a patient support surface, and a controller or processor configured to control the linac apparatus. The device will also comprise an imaging apparatus or device such as a KV imager, which may inter-operate with the linac to provide an image-guided radiation therapy system.

In certain implementations, the radiotherapy device may be an MR-linac. An MR-linac device comprises both MR imaging apparatus and radiotherapy (RT) apparatus which may comprise a linac device. In operation, An MR imager produces MR images of the patient, and the linac device produces and shapes a beam of radiation and directs it toward a target region within a patient's body in accordance with a radiotherapy treatment plan. The skilled person will appreciate that such a MR imaging apparatus may comprise a primary magnet, one or more gradient coils, one or more receive coils, and an RF pulse applicator. The operation of the MR imaging apparatus is controlled by the controller.

The subject or patient support surface is configured to move between a first position substantially outside the bore, and a second position substantially inside the bore. In the first position, a patient or subject can mount the patient support surface. The support surface, and patient, can then be moved inside the bore, to the second position, in order for the patient to be imaged by the MR imaging apparatus and/or imaged or treated using the RT apparatus. The movement of the patient support surface is effected and controlled by a subject support surface actuator, which may be described as an actuation mechanism. The actuation mechanism is configured to move the subject support surface in a direction parallel to, and defined by, the central axis of the bore.

Figure 2:
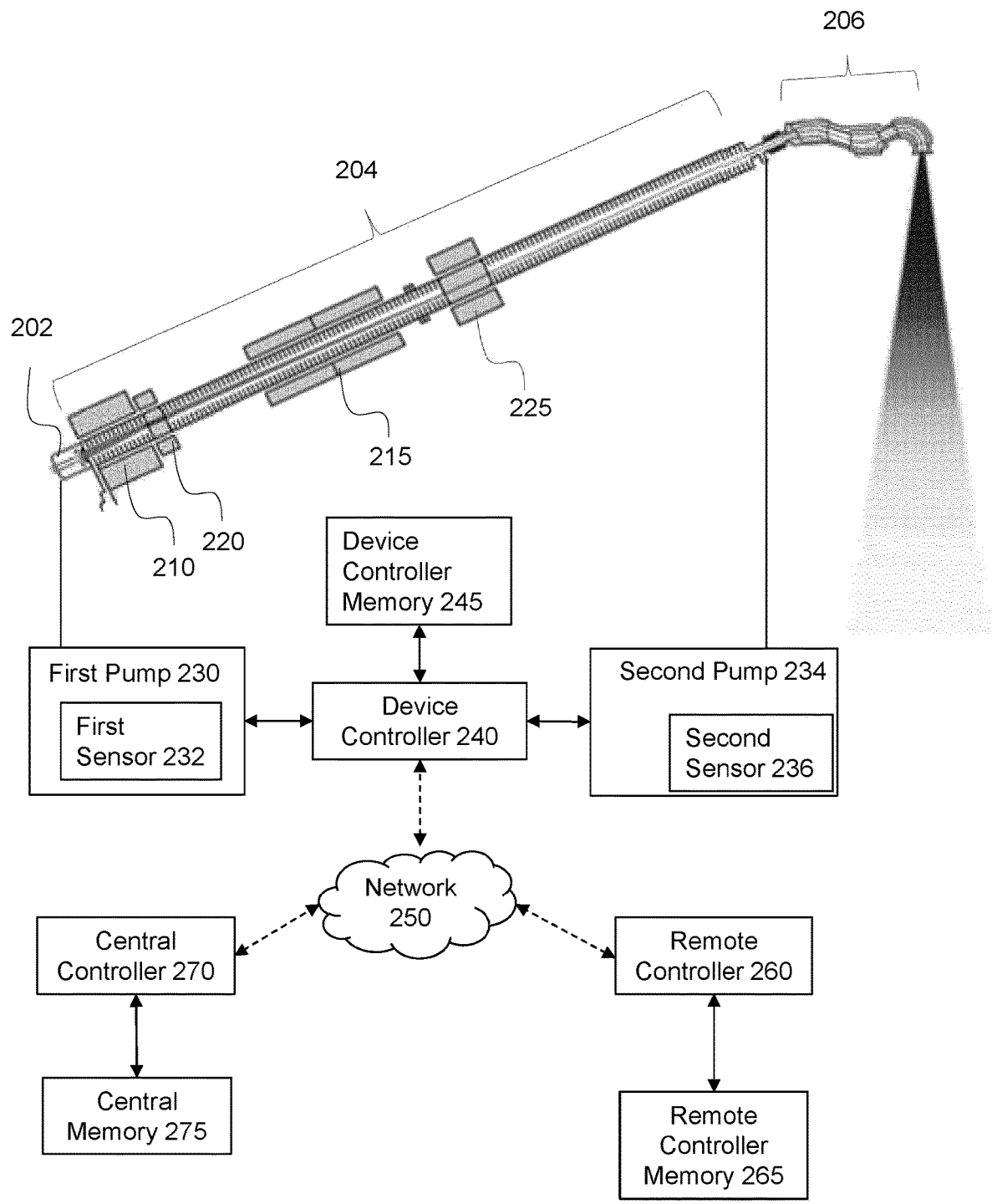
FIG. 2 depicts a schematic diagram of a system according to the present disclosure.

FIG. 2 is a schematic diagram of a system according to the present disclosure. The system comprises a radiotherapy device 200. The radiotherapy device depicted in the figures comprises a linear accelerator (linac) device, and may further comprise an MR imager such that the radiotherapy device can be described as an MR linac.

In radiotherapy devices of the present disclosure, at least one component of the radiotherapy device comprises an identifier. In a preferred embodiment, multiple components of the radiotherapy device each comprise respective identifiers. For example, any of the following components may comprise their own identifier: the magnetron, waveguide, electron gun, each magnet of the accelerating and focusing magnets, and the dosimeter and other components within the linac treatment head.

The identifiers are suitable for identifying, and configured to identify, a respective component of the radiotherapy device. The identifiers may be described as labels or tags. The identifiers carry, contain or otherwise comprise information which allows the component to be identified. The identifiers may be, for example, radio-frequency identification inlays, or tags. The identifiers may be described as 'identifying data carriers', as they are configured to carry data regarding the identify of the part to which they are attached.

The identifiers are configured to provide identifying information, which may be described as identifying data, regarding the component they are associated with. This identifying information may include a unique ID associated with that component which was assigned during the manufacturing process. The identifying information may also comprise information such as the component 'type', e.g. whether the component is a magnetron, electron gun, or other component variety.

The radiotherapy device comprises a reader 241 which is configured to receive information from each unique identifier. As will be discussed in greater detail below, the reader may comprise an RFID reader, antenna, a camera, scanner, or a mechanism by which to read physical marks. The reader 241 is coupled to the device controller and configured to provide signals to the device controller 240 which are indicative of the identity of each of a plurality of components of a radiotherapy device 200.

The radiotherapy device 200 depicted in FIG. 2 is a schematic diagram and is intended only for the purposes of illustration. The device 200 comprises a flight tube 206, bending and steering magnets 215, 225, 220, a waveguide 204, and an electron gun 202. These are all examples of components which could be provided with identifiers. In addition, any of the radiotherapy device could be provided with identifiers, for example the magnetron, the beam shaping apparatus such as the MLC, the circulator, the processors and memory devices, etc.

First Implementation of Identifiers—RFID

In a first implementation, the identifiers comprise RFID tags or inlays. The RFID tags are attached to the components of the radiotherapy device. In the first implementation, the system comprises an RFID reader comprising an antenna 241. The antenna 241 is communicatively coupled to the device controller 240, and the device controller 240 is configured to receive and process the data acquired by the RFID reader. The antenna 241 can be described as an RFID reader and can be part of an RFID initiator. In systems according to the present disclosure, the RFID reader comprising the antenna 241 may be described as an RFID initiator, while the RFID tags of the identifiers may be described as targets.

There are two principle RFID modes of operation. In the first mode, the identifiers each comprise an active RFID tag, and in the second mode, the identifiers each comprise a passive RFID tag. In the active mode, each identifier comprises a power supply. This may be an internal battery or a connection to an external source of power. Each tag is configured to generate its own electromagnetic field and transmit, i.e. provide, the identifying information. The identifying information can be provided by the identifiers either in response to a signal received from the RFID initiator (so-called transponder or 'active transponder' systems) or at regular intervals (so-called 'beacon' systems). Each of the identifiers may comprise a power supply, and an active transmitter configured to repeatedly transmit the identifying data identifying the component. In the second, passive mode of operation, the RFID tags of each identifier derive power from the antenna 241. The initiator antenna 241 creates an electromagnetic carrier field and the RFID targets each modulate the carrier field in a specific manner in order to provide the identifying information.

In an example according to the first implementation, the device controller 240 controls the operation one or more stationary antennas 241, such that the device controller 240 can communicate with the RFID tags of the components comprising the radiotherapy device 200. In this example, the identifiers comprise a passive RFID tag, and the one or more antennas 241, also known as reader antennas, supply power in the form of radio frequency waves to each identifier.

In this example, a radiotherapy device 200 comprises a device controller 240 coupled to an RFID tag reader, such as the antenna 241 depicted in 241. The radiotherapy device also comprises at least one component, and preferably a plurality of components, each of which is fitted with, provided with, or otherwise comprises an identifier comprising a passive RFID tag. In operation, the controller sends signals to, or otherwise controls, the RFID tag reader to interrogate the component identifiers. The device controller 240 can then receive identifying information from each identifier, and interact with the central processor 270 in a manner described elsewhere herein to ensure that each component is properly authorised for use with the device 200. This example has the advantage that the machine is autonomous and can perform its own 'authorisation check' at any time when prompted by the device controller 240.

In a related example, the radiotherapy device may comprise multiple RFID tag readers, each coupled to the device controller 240. This may be described as a network of readers, or a network of sensors. Each of the tag readers may be positioned around or near the device to ensure that each RFID tag on the device 200 may be interrogated and its resulting signal received.

In a second example, a field service engineer uses a dedicated RFID reader or scanner to scan the device 200. The reader is configured to communicate with the RFID tags, receive signals indicative of the identifying information from each tag, and either pass those signals or the decoded identifying information to the device controller 240.

The device controller 240 is thus configured to receive identifying information from each component of the device 200 which has been provided with an identifier. This information may be stored in the device controller memory 240.

Second Implementation of Identifiers—Optical Mark Recognition

In a second implementation according to the present disclosure, each identifier comprises an optical mark, or optical identifier. By way of an example, the optical identifier may be a QR code or a barcode. Optical marks could be used instead of, or in combination with, RFID tags and other disclosed identifiers.

In a disclosed implementation, the optical mark may comprise a serial number. Several components of the radiotherapy device comprise a serial number identification plate. The serial number identification plate may be fixed to a spare part to be added to the radiotherapy device, or alternatively a tamper-proof label which would enable the service engineer to scan the part identity.

These marks can be read by dedicated optical scanners, which may be located around or comprised within the radiotherapy device. In an example, the radiotherapy device comprises multiple optical readers/scanners, such as cameras, each configured and positioned to scan the identifier of at least one component of the radiotherapy device. Each optical reader or scanner is coupled to the device controller 240 so as to provide identifying information regarding each of a plurality of components to the device controller. In another example, each field service engineer carries a dedicated optical scanner configured to read the optical marks/identifiers of each component.

Third Implementation of Identifiers—Physical Marking

In a third implementation according to the present disclosure, each identifier comprises a physical mark comprising identifying information. The physical mark may comprise, for example, ridges which together form a mark which is indicative of a unique component ID. For example, physical marks analogous to QR codes can be "printed" onto labels that are fixed to a device or component alongside the serial number, and other identifying details.

It is also envisaged that a combination of different identifier types may be used. For example, the system may comprise a combination of RFID tags and/or optical and/or physical markings.

The skilled person will appreciate that while RFID, optical marking and physical marking have been discussed, any automatic identifying technology can be used.

Storing a Manifest, or Log, of Component IDs at the Device Controller

In a disclosed embodiment, the device controller receives identifying information from the identifiers via the reader 241 and maintains a component manifest, log, or database stored at the device controller memory 245. In an example using RFID tags, the reader 241 regularly interrogates each identifier of the radiotherapy device 200, and the device controller regularly updates the database stored at local memory 245. For example, the device may undergo this authorisation check daily, for example at midnight every day. The database stored at the device controller/local memory 245 can be viewed, accessed, and updated if needed via the device controller 240. The device controller also regularly syncs the database with the central controller 270. This can be described as sending data identifying at least one component of a radiotherapy device to the central controller 270. The central controller 270 can then compare the identifying data received at the central controller 270, for example the data comprised within the database, with authorisation data in a manner described elsewhere herein.

Components of the Device which would Comprise an Identifier

Any and all components of the radiotherapy device may comprise an identifier. Exemplary components include the magnetron, electron gun, circulator, waveguide, vacuum pump(s), imaging panels, beam shaping apparatus such as the MLC, bending/steering magnets, MR imaging apparatus may comprise a primary magnet, gradient coils, receive coils, RF pulse applicator (etc). It is envisaged that at least the more expensive/higher value components will be fitted with identifiers.

Tamper-Evident/Tamper-Proof Mechanisms

Further, in some implementations, each identifier is provided with a tamper-proof or tamper-evident mechanism. Such mechanisms allow manufacturers and owners of radiotherapy devices to prevent or learn of any attempt to remove an identifier, for examples for the purpose of counterfeiting or unauthorised re-sale of a device component.

For example, there may be physical of protection for visually scanned items, such as a "don't use if seal broken" tag. The physical means would allow the tag to be visually inspected to verify the provenance of the tag itself.

System Features: Processors and Authorisation Database

The radiotherapy device further comprises a device controller 240 and a device controller memory 245. The device controller 240 is configured to receive, or produce based on information provided by at least one identifier, identifying information identifying at least one component of a radiotherapy device. The device controller 240 is electronically and/or communicatively coupled to the device controller memory 245.

The device controller 240 is communicatively coupled to a central controller 270, for example via a network 250. The device controller 240 is configured to transmit, i.e. send, data such as the identifying information to the central controller 270. The central memory 275 may comprise a server of a number of different servers as part of a cloud storage solution. The central controller 270 is communicatively coupled to a plurality of radiotherapy devices (not shown in the figure) via the network 250. Each radiotherapy device comprises a device controller, device controller memory, and a plurality of components with identifiers attached thereto.

The device controller 240 and central controller 270 may each be described as processors, computers, or computing devices. The controllers may be connected (e.g., networked) to each other and/or to other machines in a Local Area Network (LAN), an intranet, an extranet, or the internet. The controllers may each operate in the capacity of a server or a client machine in a client-server network environment, or as a peer machine in a peer-to-peer (or distributed) network environment. The controllers may each be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only two controllers are depicted in FIG. 2, the term "controller" shall also be taken to include any collection of machines (e.g., computers) that individually or jointly execute a set (or multiple sets) of instructions to perform any one or more of the methodologies discussed herein.

The approaches of the present disclosure may be embodied on one or more of the device controller memory and the remote controller memory, or any other computer-readable medium. The medium may be non-transitory computer-readable mediums. The computer-readable medium carries computer-readable instructions arranged for execution upon a processor so as to make the controller/processor carry out any or all of the methods described herein. The term "computer-readable medium" as used herein refers to any medium that stores data and/or instructions for causing a processor to operate in a specific manner. Such storage medium may comprise non-volatile media and/or volatile media. Non-volatile media may include, for example, optical or magnetic disks. Volatile media may include dynamic memory. Exemplary forms of storage medium include, a floppy disk, a flexible disk, a hard disk, a solid state drive, a magnetic tape, or any other magnetic data storage medium, a CD-ROM, any other optical data storage medium, any physical medium with one or more patterns of holes, a RAM, a PROM, an EPROM, a FLASH-EPROM, NVRAM, and any other memory chip or cartridge.

Arrangements, systems and methods of the present disclosure comprise an authentication database. The authorisation database holds information about which components are authorised for use with which radiotherapy devices. The data which forms the authentication database is stored on the central memory 275 and may be queried by the central controller 270. The authentication database comprises information about each component of the radiotherapy device which has been provided with an identifier. The authentication database stores each unique component ID, along with information regarding with which radiotherapy device each component is authorised for use by the manufacturer. Each radiotherapy device is identifiable by a unique device ID. Each unique component ID may be associated with a particular unique radiotherapy device ID. Alternatively or additionally, each unique component ID may be associated with a particular service contract. As with each radiotherapy device, each service contract has its own unique identifying ID. Each radiotherapy device has its own service contract, and which components are authorised for use with the machine may be governed by the terms of the service contract.

The authorisation database may also comprise information about device owners. The authorisation database may be queried in order to determine, for example, which components currently form part of a particular radiotherapy device, who owns the radiotherapy device, and whether the components forming part of a machine are authorised for use with that machine. The authorisation database may also comprise information regarding the time remaining on the warranty of particular components, information regarding the remaining operational life of a component, and information regarding whether the component has been decommissioned or rendered unsafe for use during repair and maintenance. For example, the authorisation database may store information indicating that a particular magnetron, as identified by its unique component ID, has been decommissioned. The authorisation database may further comprise information regarding the operational status of a particular component. The operational status of a component may indicate that a component is deemed to be operational, unsafe to operate, inside or outside of warranty, listed as having been decommissioned or 'thought to be decommissioned', lost, unauthorised for use by any device, etc.

By way of an example, if a magnetron shows signs of failure then the problem may be diagnosed and fixed in situ. Alternatively, the magnetron may be sent through a so-called repair loop, sometimes involving the original supplier. The supplier, or other off-site test point, may fix the magnetron and return it to the site of the radiotherapy device. Alternatively, supplier, or other off-site test point, may determine that the specific magnetron is faulty and cannot be repaired. In this instance, the authorisation database is updated to indicate that this component is no longer valid/authorised for use. If the central controller 270 learns that this component is being used by any radiotherapy device, then it is likely that a safety criterion will not be met and the central controller 270 determines that the device is not authorised for use.

The radiotherapy device 200 also comprises an authorisation mechanism 290. The authorisation mechanism 290 is controlled by the device controller 240. The authorisation mechanism 290 is configured to either allow, or disallow, operation of the radiotherapy device based on information provided by the device controller. In an example implementation, the authorisation mechanism 290 comprises an automated stopping or shut-down mechanism which may stop or shut down the radiotherapy device 200. The authorisation mechanism 290 is a safety mechanism configured to halt operation of the radiotherapy device 200 in the event that any of the components which form part of the device 200 are not authorised for use with that machine.

In a simple example implementation of the authorisation mechanism 290, the mechanism comprises a controllable switch located between a power source configured to provide power to the radiotherapy device 200 and the device 200 itself. When the switch is closed, power is provided to the radiotherapy device 200 in accordance with the usual operation of the device. However, should the device controller 240 become aware that a safety criterion is not met, the switch is opened and hence power cannot pass to the radiotherapy device 200, rendering it unable to operate. As will be discussed in greater detail elsewhere herein, a safety criterion may relate to whether or not a particular component is not authorised for use with that machine, that a component has been or should have been decommissioned, or that the age of the component has extended beyond its operational lifetime.

The authorisation mechanism may be incorporated into existing, known clinical safety checks. For example, it is known to have a check to confirm whether the system can be used clinically, which is always checked when a clinical user logs in. This simple mechanism could be the implementation of an authorisation mechanism.

There may also be multiple mechanisms so as to halt power to particular components. For example, if an electron gun is not authorised for use with the machine, the power supply directed to that electron gun may be halted. In another example, if a faulty imaging panel is detected, but the user is not imaging the patient for this session, then the device is determined as authorised for use and the device is still able to function. It is envisaged to have multiple authorisation mechanisms based on the (clinical) techniques the user is expected to use in this session. If all authorisation checks succeed then the device is authorised for use and the user can continue.

Method

Figure 3:
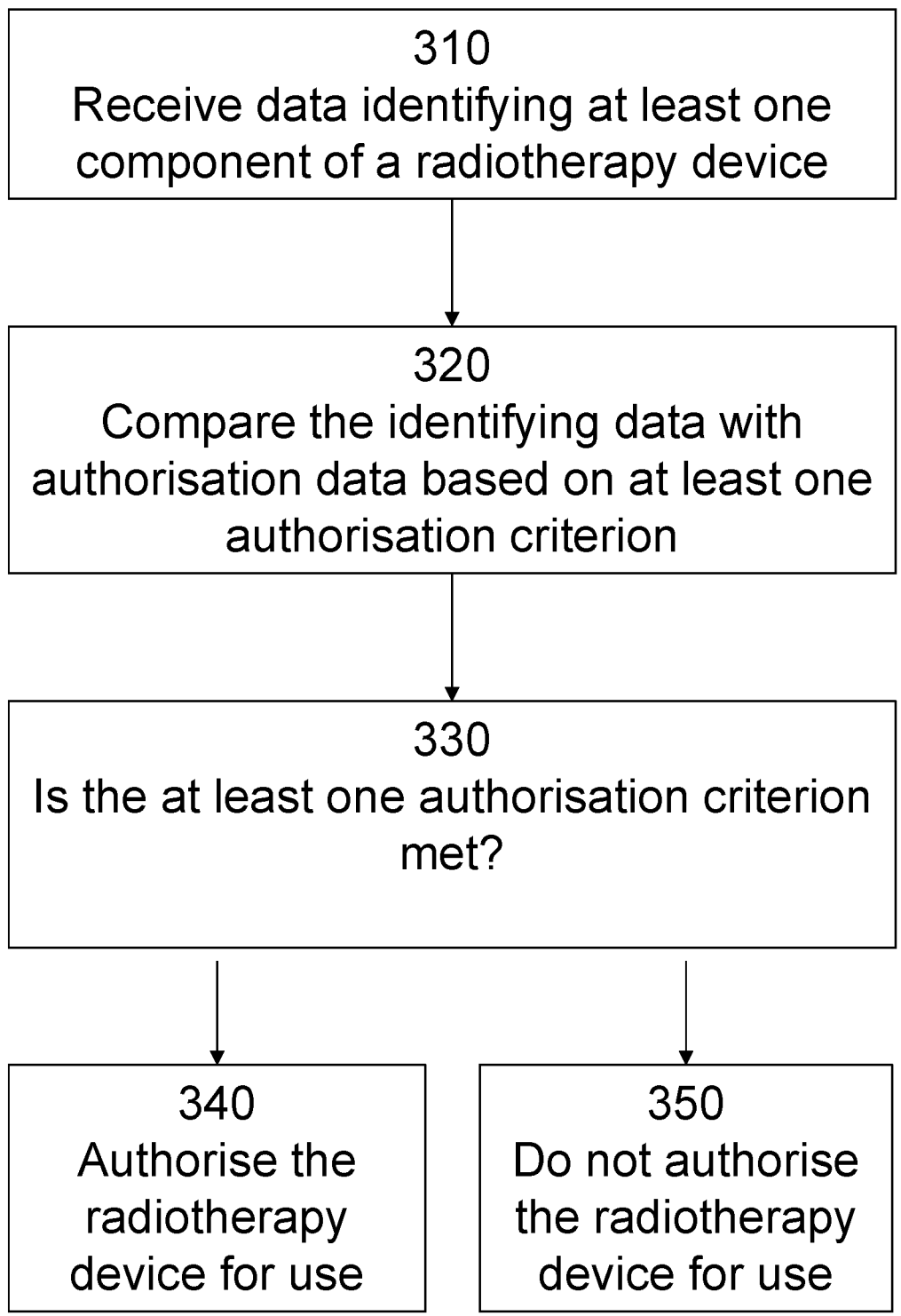
FIG. 3 depicts a method according to the present disclosure.

The flowchart of FIG. 3 depicts a method according to the present disclosure. The method is suitable for being carried out, for example, by the central controller 270. At step 310, data which identifies at least one component of a radiotherapy device is received. The data may be described as identifying data, or identifying information. The identifying data may be received from a device controller 240 associated with a radiotherapy device 200, or directly from a dedicated reader such as an RFID reader or optical mark scanner. The identifying data comprises information which allows a particular component of the radiotherapy device to be identified.

The identifying data may comprise the unique ID of the component which, as discussed elsewhere herein, is assigned to the component upon manufacture of the component. The identifying information may also comprise a unique device ID which identifies the radiotherapy machine 200. In other words, the identifying data may comprise information which allows the radiotherapy machine as well as at least one component of the radiotherapy machine to be identified.

In a preferred embodiment, the identifying data comprises information which allows each of a plurality of components of the radiotherapy device or machine to be identified. The data identifying at least one component of a radiotherapy device may comprise a manifest or catalogue of component IDs. In a simple example, the device controller 240 receives identifying information from a magnetron, an electron gun, and the dosimeter of a linac device. The identifying information comprises the unique IDs of each of the magnetron, electron gun, and dosimeter, as well as the unique device ID of the radiotherapy device which they form part of. The device controller 240 communicates this identifying information, through the network 250, to the central controller 270, and the central controller receives this identifying information at step 310.

At step 320, the identifying information is compared with authorisation data based on at least one authorisation criterion. The authorisation criterion may also be described as a safety criterion. The authorisation data is stored in the authorisation database. The comparing may comprise querying, by the central controller 270, the authorisation database stored in central memory 275. The comparing comprises checking whether a safety criterion is met. Checking whether the safety criterion is met may comprise checking that each component identified in the identifying data received at step 310 is listed as being authorised for use with the radiotherapy machine 200 they form part of. For each component, the safety criterion may be that the component is listed with a particular operational status. For example, step 320 may comprise ensuring that the device component is not, according to the information contained in the authorisation database, thought to have been lost, decommissioned, damaged, or thought to be operating outside of its safety parameters. Checking that the safety criterion is met may comprise checking that each component is authorised for use in accordance with a particular service contract. Service contracts are identifiable by unique identifying IDs, and in turn, a service contract is tied to a particular radiotherapy device or machine. This means that particular components can be authorised for use under particular service contracts, which in turn authorises the component for use with particular machines.

At step 330, it is determined whether the safety criterion is met. This step is based on the comparison at step 320 as discussed above. In other words, it is determined whether a safety criterion is met by comparing the identifying data with authorisation data.

If the safety criterion is met, the radiotherapy device is authorised for use at step 340. In other words, the device is deemed safe and suitable for operation. In the simple example given above wherein the identifying data comprises information about just three components, i.e. a magnetron, an electron gun, and a dosimeter, it may be determined that each of these components is authorised for use under the service contract tied to the radiotherapy device they are currently comprised within. Accordingly, the device is deemed to be safe to operate. It will be appreciated that the safety criterion can be designed in accordance with the specific goals of the manufacturer, e.g. to ensure that regulatory requirements are met, that components which should have been decommissioned are not present in the device, and that none of the components have been incorrectly installed in a machine for which the component has not been authorised. If the safety criterion is not met, at step 350 the device is not authorised for use. This may comprise determining that the device is not safe for operation.

Optionally, following either or both of steps 340 and 350, the method may further comprise sending a communication, or indication, to the device controller 240 indicating whether the at least one component is authorised for use with the radiotherapy device. In other words, the indication indicates either that the at least one safety criterion has been met, or that the at least one safety criterion has not been met. This is discussed in greater detail below with reference to FIG. 4.

In a disclosed implementation, in response to a determination at step 350 that a component of the radiotherapy device is not authorised for use, an email or other communication is sent to the device owner/and/or an Elekta service engineer indicating the cause of the authorisation failure. This allows the owner, or engineer, to make a determination as to whether human intervention is required in the system.

Figure 4:
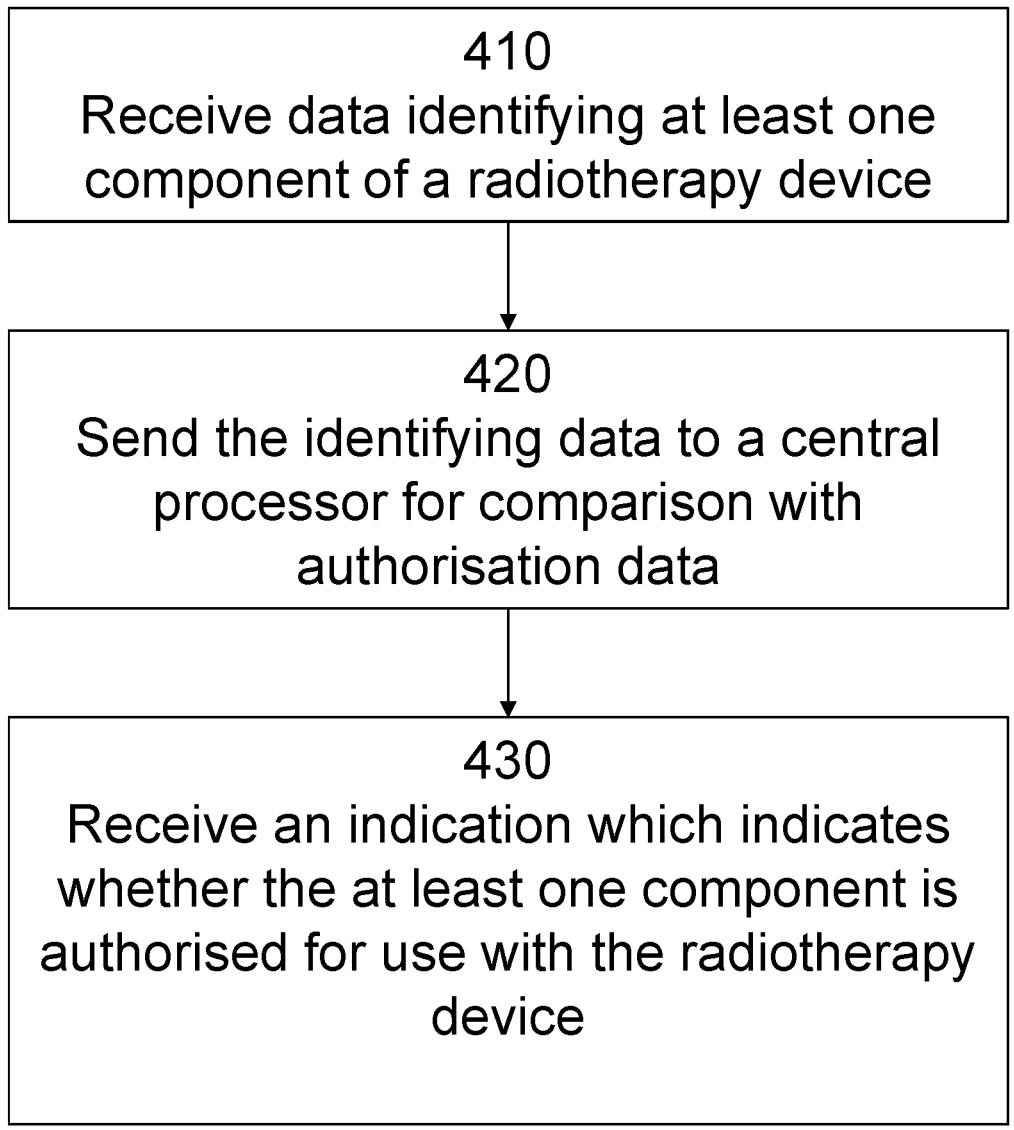
FIG. 4 depicts a method according to the present disclosure.

The flowchart of FIG. 4 depicts a method in accordance with the present disclosure. The method is suitable to be carried out, for example, by a device controller 240 of a radiotherapy device 200, or by a combination of a dedicated identifier/tag reader and a device controller 240.

At step 410, data identifying at least one component of a radiotherapy device is received. The manner in which the data is received depends upon the particular implementation of automatic identification technology. For example, the identifying data may be received at the device controller following interrogation, by an antenna in communication with the device controller, of RFID tags placed on each component. Alternatively, a field service engineer may use an RFID, optical mark or physical mark scanner or reader to scan each identifier associated with the radiotherapy device. The scanner or reader may comprise a processor which allows the scanner or reader to process the received signals or information from the component identifiers.

In an example in which a radiotherapy device comprises a plurality of components each with their own identifier, the data identifying at least one component of a radiotherapy device may comprise data identifying a plurality of devices. This may be in the form of a manifest or catalogue of component IDs.

At step 420, the identifying information is sent to a central processor for comparison with authorisation data. It will be appreciated that the scanner or reader may be in communication with the network 250 and thus may send the gathered information from the identifiers directly to the central processor 270. Alternatively, the scanner or reader may send the information to the device controller 240 to allow the device controller 240 to send the identifying data to the central controller 270. With reference to the flowchart of FIG. 3, the data identifying at least one component of a radiotherapy device is received by the central processor at step 310.

At step 430, an indication is received which indicates whether the at least one component is authorised for use with the radiotherapy device. The indication may be received from the central processor 270 after it has been determined at step 330 whether the at least one safety criterion has been met.

In response to receiving the indication at step 430, the device controller 240 may send a signal to the authorisation mechanism. The device controller 240 sends a signal to the authorisation mechanism 290 based on the received indication, and the authorisation mechanism 290 either allows the device 200 to operate, or stops the device 200 from operating, based on the signal. In an example, the device controller 240 allows the radiotherapy device to operate in response to receiving an indication that all the components of the device are authorised for use with the radiotherapy device.

In a simple example, and with reference to the methods of FIGS. 3 and 4, data is received at the central controller 270 which identifies a particular magnetron which forms part of a particular radiotherapy machine. The identifying data is compared with the data which forms part of the authorisation database, and it is determined that the magnetron has been erroneously installed in that particular radiotherapy device. The data stored in the authorisation database indicates that the magnetron is instead authorised for use within another, different radiotherapy machine owned by the same hospital. Accordingly, a safety criterion is not met, and the particular radiotherapy device is not authorised for use. The central controller 270 communicates this determination to the device controller 240, which in turn instructs the authorisation mechanism to prevent the device from operating. The device is prevented from operating until the magnetron component has been replaced with a correctly authorised component and an indication of this correct authorisation has been received at the device controller 240 from the central controller 270.

In some implementations, rather than making use of an authorisation mechanism which can control whether the device can operate, or in addition to this functionality, following authorisation at step 340 or a determination that the device should not be authorised at step 350, one or more notifications may be issued. For example, following step 350, a notification may be issued to the device manufacturer which informs the manufacturer of any components in the radiotherapy device which do not meet the safety criterion, or safety criteria, at step 330. For example, the manufacturer may be informed that one or more components are not authorised for use with the radiotherapy device they currently form part of. A notification may also be sent to the device owner informing them of any components which do not meet the safety criterion, or criteria. The notification may manifest itself as a warning on a display control screen or an automatically generated email informing the manufacturer of which components have failed the authorisation check(s). The identification of components which are not authorised for use with the radiotherapy device may cause a note of any such components to be made in an event log stored in the device controller memory 245 and/or the central controller memory 275.

The methods disclosed herein reduce the time and possible errors which may be associated with a manual check that the components of a radiotherapy device are correctly authorised. The disclosed methods allow greater control over which components form part of a radiotherapy device. Accordingly, it can be ensured that only certified, or authorised, components form part of the device. Counterfeiting and unauthorised repair and re-sale of replacement machine parts can be identified and halted before the device is declared operational during servicing. The present methods help manufacturers, machine owners, and other supply chain entities to ensure regulatory compliance and to ensure no counterfeit or uncertified reconditioned parts can remain in circulation and be useable.

Data Log

The authorisation database may also comprise a log of all service-related activities performed on, with, or associated with a particular device component. This may be described as a service log of activities performed by engineers. For example, every time a repair of a particular component is performed, the field service engineer updates the database with details of the repair. Where the service activity involves replacing a component, this should also be logged and verified by the automatic start-up procedure. Combining a history of regularly received information which identifies particular device components forming part of the device (e.g. start-up manifests stored either locally at the device or centrally), together with an event log of service activities, would enable a field service engineer to locally and remotely identify which new parts were fitted, when they were changed, and by whom.

The data log may store other data, either in addition or instead of service-related data. The method may comprise maintaining a data log which stores the received data identifying each component of the plurality of components. The data log may be stored locally at the device, or else centrally. The data log may form part of the central authorisation database.

In an example, a duration of instalment of each of the plurality of components may be derived from the data log. In this example, the data log stores the received identifying data along with a timestamp indicating the time of receipt of the data. The time from the earliest timestamp associated with that component until the present time is indicative of the instalment duration for that component. The method comprises storing this data in the data log. In this example, the authorisation data comprises an operational lifetime of one or more components of the plurality of components, and the authorisation criteria comprises an instalment time threshold. Determining whether the at least one authorisation criterion is met may therefore comprise comparing the duration of instalment to the operational lifetime based on the instalment time threshold. According to an example, the operational lifetime of a radiotherapy device electron gun is listed in the authorisation database as 12 months. This lifetime may be based on information provided by the manufacturer, or else may be based on data from service related activities associated with that particular electron gun. The operational lifetime may be based on data received from the electron gun and/or device regarding the performance of the electron gun. The data log at the radiotherapy device indicates that the earliest recorded identifying data received from the electron gun was received 11 months ago. Based on the instalment time threshold for the electron gun of 1 month, i.e. 1 month from reaching the end of its operational lifetime, the radiotherapy device is considered not authorised for use. The method may further comprising sending a series of indications and/or warnings to users the device manufacturer as the instalment time of the electron gun approaches its operational lifetime. This comparison of instalment time with the operational lifetime may be used to trigger the ordering of a spare part or the scheduling of a servicing point, hence reducing machine downtime.

In another example, the authorisation threshold is not based on instalment time, but expected location. In this example, each of the identifiers comprises a power supply, and an active transmitter configured to repeatedly transmit the data identifying the component. The radiotherapy device comprises a receiver configured to receive signals from the active transmitters of the identifiers. It is possible, using known techniques such as triangulation, to determine the location of the active transmitter, and hence the component or item to which the identifier is fixed, based on the signal strength at the receiver. In this way, a location of each of the plurality of components may be derived from the data log. In this example, the method further comprises determining a signal strength when receiving data identifying a component from an active transmitter, and logging the signal strength in the data log along with the received identifying data. Users may review the data log to review each ping location in order to review the movement of the identifier, and hence the movement of the component it is affixed to. A user may request the last-known location of one or more components of the plurality of components, and the radiotherapy device processor will provide the location to the user in response to the request. The location may be provided to a device from which the user made the request. As described below, the use of a plurality of receivers allows the location of the component to be determined with greater accuracy, and in two or more co-ordinate axes. For example, two receivers spatially separated along an axis parallel with the floor may be used to determine a rough co-ordinate for the identifier in that axis.

In this example, the authorisation data may comprise an expected location of one or more components of the plurality of components, and the authorisation criteria may comprises a distance threshold. Determining whether the at least one authorisation criterion is met comprises comparing the determined location of a component to the expected location of the component based on the distance threshold. In an example, it can be determined that a component has been uninstalled, or has not been correctly installed to the correct radiotherapy machine, based on a distance measurement from the radiotherapy machine. This functionality can be used to address mishandling of components on-site which may sometimes lead to components being installed on the incorrect radiotherapy machine.

The method may further comprise receiving data identifying a newly installed component of the radiotherapy device from an identifier coupled with the newly installed component. The identifying data associated with this component cannot be found in the data log stored in the radiotherapy device memory, which suggests that the component is a new component. This determination can be confirmed by querying the central authorisation database to determine whether the new component is authorised for use with the radiotherapy machine. The method therefore may further comprise determining that the newly installed component has been newly installed based on the received identifying data and data stored in the data log, determining whether the at least one authorisation criterion is met based on the identifying data received from the newly installed component and authorisation data. If the at least one authorisation criterion is met, the radiotherapy device is authorised for use.

Scanning and Review of Replacement Components

In a particular implementation, when the radiotherapy machine is first constructed onsite, for example at a hospital, it will not operate until the identity of each component has been checked with the central authorisation database and authorised by the central controller. Then, each time the machine is serviced or repaired, before the device becomes operational it will again check that its components are authorised for use before it becomes operational.

In a simple example, a field service engineer attends a device which has been determined to be operating sub-optimally. The engineer determines that the fault is associated with the magnetron. The engineer determines that, to correct the fault, the magnetron must be replaced. Following procedure, the engineer removes the old, faulty magnetron from the radiotherapy machine, and updates the central database to indicate that the magnetron has been decommissioned. Similarly, the database may be updated to indicate that the operational status of the old magnetron is faulty or not operational. The field service engineer updates the database to reflect that the new, replacement magnetron has been installed in the radiotherapy machine. The new magnetron is now listed as being authorised for use by the radiotherapy machine, and the old, faulty magnetron is now listed as not being authorised for use with any radiotherapy machine. When the radiotherapy machine has been repaired and is powered up for operation, data which identifies the replacement magnetron is received at the device controller and sent to the central controller to be compared with authorisation data. The device may operate only when the new component is authorised. Similarly, if at a later date the unique ID associated with the old, decommissioned magnetron is received at the central controller 270, then authorisation of the component will fail and the device which incorporates the decommissioned magnetron will not be deemed to be operational.

Tracking the Removal of Components from the Radiotherapy Device

According to an example, the method may comprise connecting the power supply of each of the identifiers with a device power source; determining that a component of the plurality of components has been disconnected from the device power source; and continuing to receive identifying data and log the signal strength in the data log along with the received identifying data.

When installed on the radiotherapy device, the internal power source of the active identifier will be constantly charging by virtue of its connection to a radiotherapy device power source. When extracted from the device, the component tracking signal will be activated. For example, a chip or small processor forming part of the identifier will determine that it is no longer being charged by the radiotherapy device. The radiotherapy device itself may also determine that the identifier has been disconnected from the device power source, and determine that the component is undergoing service activity, being replaced, or else is otherwise being disconnected from the radiotherapy device.

The FSE will tag ID (part+serial#) to return event as part of the 'deinstallation' activity currently in effect when replacing parts. Component location will be registered as per the outbound event protocol. Each ping will be logged until out of range. Since items left for collection at hospital sites will be collected by courier the component will still be in range until collected.

Updating and Maintaining the Accuracy of the Central Database

Particular field service engineers may be granted database access rights according to their qualifications, certifications, and/or length of time of employment with the servicing and repair business, etc. Particular access rights may also be granted to workers in logistics and the supply chain such that they can update the authorisation database according to their respective access rights.

In some examples, the component unique ID is generated upon manufacture. The component is assigned a particular ID, for example its serial number, and an entry is created in the authorisation database for that component. The entry indicates the type of component and its unique ID, along with its status. The status of the component may indicate it has been purchased by a service/repair entity or may indicate that the part is in storage, for example. Each status may also have an associated timestamp, which allows the authorisation database to be used to determine how long a particular item or component has been in storage.

Once it has been determined that a particular radiotherapy device requires a replacement component, for example by a field service engineer conducting on-site testing or via predictive or diagnostic maintenance techniques, an order can be processed for the component and its status can be updated from an indication that it is being stored, to an indication that it is en-route to the particular radiotherapy device. At this time, the authorisation database is updated to indicate that the particular component is for use with the particular radiotherapy device.

Alternatively, the authorisation database may be updated by an authorised field service engineer onsite at the device when a new or replacement component is installed. In this example, the engineer updates the database, either via his or her own dedicated computer or via the device controller 240, to indicate that a component has been installed at a particular device and therefore that the component is authorised for use with that device.

Other Embodiments

It will be understood that the above description of specific embodiments is by way of example only and is not intended to limit the scope of the present disclosure. Many modifications of the described embodiments, some of which are now described, are envisaged and intended to be within the scope of the present disclosure.

Inventory Management

The presence of RFID tags on various components of the radiotherapy device also has benefits in the fields of inventory management and asset tracking. The central database may store information regarding 'events' associated with ach particular component. These events may have associated event data, such as location at which the identifier of each component was read, and by which RFID reader. As part of these implementations, multiple antenna readers are placed along the supply chain so that the readers can scan device components at key times and at key locations in their operational lifetime. The event data may comprise the location and time at which the component was scanned by a tag (identifier) reader. The event data may also comprise information which identifies the tag reader scanned the component.

For example, and with reference to the methods of FIG. 3 and FIG. 4, in an example, an engineer updates the central authorisation database to indicate that at least one component of a radiotherapy device does not meet a safety criterion, and/or that the at least one component is no longer authorised for use with the particular radiotherapy device. The component may be an electron gun, for example, which has approached the end of its useful operational life and is therefore no longer suitable to be used in a radiotherapy device. The engineer updates the database to reflect that the electron gun is to be decommissioned and destroyed. The identifying data associated with the electron gun, and which is derivable from the identifier, is now associated with authorisation data stored in the central memory which indicates that the electron gun has been decommissioned and is not authorised for use with any radiotherapy devices.

After it has been determined that a part needs to be decommissioned and/or destroyed, an on-site field service engineer removes it and takes it to decommissioning site, or else schedules for the part to be collected and transported to the decommissioning site. These actions are determined by logistics procedures.

The presence of the identifier allows the electron gun to be tracked on its journey as it travels toward an official, certified decommissioning site. Tag readers may be placed at the entrance/exit of a manufacturer's loading vehicle so as to record and log which components and machine parts have been loaded onto the vehicle. In this example, as the decommissioned electron gun is loaded onto the vehicle at the hospital site to be taken from the site to be decommissioned, the antenna tag at the vehicle loading door reads the electron gun tag, and the central authorisation database is updated to reflect that a new event has occurred with respect to this component, i.e. that it has been loaded onto a vehicle for transportation to a decommissioning site. The component is also similarly scanned, and the associated event data logged, when the component is unloaded from the transport vehicle and when the component arrives at the decommissioning site. This functionality assists in ensuring that components are indeed decommissioned or disposed of properly when they have been deemed unfit for use within a radiotherapy device, and thus assists manufacturers are repair providers in meeting their regulatory requirements.

In a further example of a disclosed implementation, this functionality is also used when shipping/transporting components to the site. For example, as the component leaves the factory or warehouse, a tag reader placed at the exit to the warehouse reads the tag and the central database is updated to log a new event associated with the component. For example, the new event data may indicate that the component has left the warehouse. The following events may include the component being scanned and its identifier read as it is loaded onto a transport vehicle, and then again when it arrives at the hospital or other machine site.

Using disclosed methods together, it can be determined when the warranty period starts in connection with a relationship between a supplier of a part (e.g. of a magnetron) and a supplier of a device (e.g. this warranty period may start when the part is provided to the device supplier), and also when a warranty period starts in connection with a relationship between the supplier of the radiotherapy device and a customer/purchaser of the radiotherapy device (this warranty period may start when the purchaser/owner starts using the device).

Having visibility of the warranty periods of parts in stock helps the various companies manage their stock more effectively and in a manner which ensures that parts are provided under a correct warranty. The disclosed methods also help to avoid a scenario in which there is an undesirable mismatch of the warranty periods, which may lead to a scenario in which the supplier of the radiotherapy device is liable for the repair of a faulty part even where that part is provided by a third party supplier.

A problem with prior arrangements and methods is that engineers/couriers often have difficulty locating physical items, including components for radiotherapy devices, at hospital sites. Hospitals are large, sprawling complexes with multiple entry points (reception(s), goods in, annexes, etc. this means that tracking deliveries and/or pickup points can be difficult or impossible.

The present application refers to fitting a plurality of components of a radiotherapy device, and/or other physical items associated with radiotherapy device repair and assembly, with an identifier capable of providing identifying information about the component. For example, a unique ID. Preferably the identifiers comprise a power source and an active transmitter configured to repeatedly, for example at regular or intermittent intervals, transmit the identifying information. The signal being generated by the components/machine for authorisation protocols can be used to locate components and items nearby, for example using RFID/WIFI.

These location sensing and tracking protocols may be used across the supply chain. For example, a component for delivery may be packed with a small power source which is activated by the sending store upon receiving a request to ship a component of a device or other item to a hospital location. This activation process captures the unique ID of the component (item+serial#) and updates the authorisation database to indicate that this component is associated with particular shipping details (order+tracking id). The identifiers are configured to intermittently send an ID signal on a dedicated channel which may be received by receivers within range. Upon coming in range of any such receiver, for example one or more receivers forming part of a radiotherapy device, the component location is registered on the central authorisation database and updated upon each ping.

As described above, each ping location may be stored in a log file to show movement of the identifier, and hence component it is affixed to, when in range of a suitably configured receiver. Engineers/operators can access the location data base to see real time (last known) location of components. This data log may be used to calculate the potential vector of a component or item if it goes out of range. This potential vector can be used to help track down the component or item, for example if it is considered missing. The 'receiver' (forming part of a radiotherapy machine and/or suitably positioned throughout the hospital) will have variable receiver points in order to detect both the location on the lateral plane and also the relative elevation to the machine. The radiotherapy device may comprise a plurality of receivers, spatially separated from one another, each configured to receive a signal from identifiers transmitting identifying data regarding their component/item. The receivers may therefore be used to determine the location of the component in multiple co-ordinate axes, for example using by using triangulation techniques based on the received signal strength at each of the plurality of receivers. The combination of multiple machines, each with one or more receivers, allows for relative distance calculations in order to determine the location of the component with even greater accuracy.

According to an example, each hospital is mapped in 3D, with the location of radiotherapy devices being identified on the map. This gives a visual representation to an engineer and or operations user in order to determine the relative location of a component, and to determine, based on a determined distance of the component from each of the various receivers, which device the component is likely to be installed on, or else where n the hospital the component or item can be found.

Interaction Between Authorisation Data and Event Data

In other implementations of the disclosed concepts, discrepancies between authorisation data stored in relation to a particular component and event data stored about a particular component can be automatically flagged.

For example, if a magnetron has been deemed to be faulty by a remote service engineer, its authentication data will indicate that it is not authorised for use with any radiotherapy device. This indication would be at odds with event data that showed that the component had been returned to a warehouse, for example, rather than a decommissioning site. More generally, this authorisation data would also be at odds with event data that indicated that the faulty magnetron had been loaded onto a transport vehicle but had never made it to a decommissioning site. These discrepancies can be flagged and actioned by the central controller/processor.

In another example, it can be determined that a particular component, for example a waveguide, is authorised for use with a particular radiotherapy device at a particular hospital. However, the last available event data indicated that the waveguide had been delivered to a different site. Thus, using disclosed methods there would be at least two possible methods of identifying that this waveguide had been installed in a device for which is it not authorised. In the first method, when the waveguide is installed in the 'incorrect' radiotherapy device, it will perform self-authorisation checks in line with the methods disclosed in the flowcharts shown in FIGS. 3 and 4. The device will read the tag on the waveguide and thus receive (410) data identifying the waveguide, send (420) the identifying data to a central processor for comparison with authorisation data, and receive (430) an indication that the waveguide is not authorised for use with the radiotherapy device. This may trigger other actions such as an alarm, an on-screen prompt that the device is operating outside regulatory and/or safety requirements, the central database may be updated such that a service engineer visit is scheduled to check the authorisation status of the waveguide, the device may be prevented from operation by an authorisation mechanism, etc. In another, independent method, which does not rely on the self-authorisation checks performed by the device, the central processor may perform a check of the database for inconsistencies or 'flags'. An inconsistency would arise when it is noted that the authorisation data for the waveguide indicated that it is authorised for use with the 'correct' radiotherapy device, or a particular customer or hospital, which does not match with the location at which the event data indicates that the waveguide was delivered. This may trigger any, some or all of the triggers mentioned above.

Using the disclosed methods, discrepancies between 'event data' (i.e. locations and times at which the component was scanned) and 'authorisation data (i.e. locations and hospitals for which the component is authorised for use) can be identified and spotted with algorithms, using AI, or by humans and quickly acted upon.

The methods disclosed herein reduce the time and possible errors which may be associated with a manual check that the components of a radiotherapy device are correctly authorised. The disclosed methods allow greater control over which components form part of a radiotherapy device. Accordingly, it can be ensured that only certified, or authorised, components form part of the device. Counterfeiting and unauthorised repair and re-sale of replacement machine parts can be identified and halted before the device is declared operational during servicing. The present methods help manufacturers, machine owners, and other supply chain entities to ensure regulatory compliance and to ensure no counterfeit or uncertified reconditioned parts can remain in circulation and be useable.

The methods disclosed herein allow the automatic tracking of changes of key machine parts on each radiotherapy device. The prevention of unauthorised parts being installed on a device, or at least the identification of such an installation, is facilitated. Component parts may be tracked through the supply chain and in storage, including tracking parts being held in FSE vans or FSE personal storage. Key parts may be tracked as they are returned to the manufacturer to be decommissioned. The methods disclosed herein allow the automatic triggering of service point scheduling, and spare part order placement. The utilisation of various components may be tracked with age, and repeated changes of particular components, for example expensive parts, may be monitored. The device build state (configuration) right from factory build may be maintained. The movements of an individual component part though system, including device to device, may be tracked. The implementation of FCOs and compatibility management may be tracked. Faulty parts, identified on advice from original part manufacturer, may be located and tracked. By tracking component part type versions as part of the identifying data, instances where control system software is incompatible with certain part types versions can e quickly identified.

Field Service Engineer Authorisation

When attending a site to perform a repair or scheduled maintenance, it is often necessary for a field service engineer (FSE) to access the device controller, i.e. the computer or system of computers located on-site at the location of the radiotherapy device. The FSE may need to view information relating to the device's operation, for example over the previous few weeks or months, to aid in diagnosing a problem. For example, the FSE may view information relating to the current or power supplied to a particular component over the past few weeks. By comparing the data to known thresholds and data patterns, it is often possible to diagnose particular problems, or else rule out potential causes of a problem. The device controller also controls certain operational parameters of the device. A FSE may adjust these parameters in order to perform a diagnostic test. Alternatively, a FSE may adjust these parameters in order to address a particular issue and thus ensure continued operation of the device within safety parameters.

For example, the optimal current to be supplied to the cathode of an electron gun in order to provide a particular linac beam energy decreases over time as the cathode filament ages and degrades. Accordingly, the current required across the filament to ensure maximum dose rate for a particular linac energy decreases with time. Calibrating the optimal gun current for particular linac energies is part of regular service checks performed by FSEs.

Also, when a radiotherapy device has encountered a problem during operation and a safety interrupt has occurred, information related to the interrupt, for example the time and reason for the interrupt, will be stored on the device controller. Depending on the nature of the safety interrupt, the device controller may require an authorised engineer to access the device controller and confirm that the issue has been addressed and/or that the radiotherapy device is fit for operation again.

However, it will be appreciated that access to the device controller should be limited to authorised field service engineers, or other authorised personnel such as clinicians. Often, general engineers or even clinicians at a site may try to repair or service a device, however even seemingly simple repairs can result in complications and errors without the proper knowledge and training.

Therefore, in a disclosed method, a radiotherapy device may require that a potential service engineer identify themselves and pass an authorisation check before they are deemed to be authorised to service and/or repair the radiotherapy device.

In this method, the authorisation database stores data about which service engineers are authorised to service particular radiotherapy machines. The authorisation database stores authorisation data relating to each service engineer. The authorisation data may indicate that a particular engineer is authorised to, for example, service all machines of a particular type or category. An engineer may be authorised to perform certain activities, but not others; for example, an engineer may be authorised to install particular devices but not repair them. The authorisation data may indicate that a particular engineer is authorised to perform particular repair activities according to device characteristics, such as type, model, age, as well as who owns the device e.g. a particular hospital. The authorisation data may authorise the engineer according to the contents of a service contract associated with a particular customer, device, group of devices, device type, etc. The authorisation data may indicate that a particular engineer is authorised to perform particular repair activities according to the device owner or hospital associated with the device, for example the engineer may be authorised to service all linac radiotherapy devices owned by a particular hospital but not linac radiotherapy devices owned by a different hospital. Different engineers may also be authorised by component or part category. For example, a particular engineer may have undertaken component-specific training and thus be authorised to service magnetrons and related apparatus, but may not have taken the relevant training to be authorised to service the electron gun. This type of authorisation is often dependent on the training undertaken by the engineer, as well as materials that he or she has read and/or the hardware and software tools which they have been trained to use.

Apparatus and Infrastructure

The apparatus and infrastructure used to perform the method is broadly similar to that described above. A central computer, processor or 'controller' 270 has access to an authorisation database stored in central memory 275. A computer, processor or 'controller' 240 located at the radiotherapy device 200 is communicatively coupled to the central processor 270, for example via a network 250. The device controller 240 is able to request and receive information from the central controller 270 and central memory 275, and the central processor 270 is able to request and receive information from the device controller 240 and device controller memory 245, in the manner described generally above.

In addition, in implementations of this further method, each device controller is communicatively coupled to an input means. The input means may comprise an input device, system or arrangement. The input means is arranged to collect identifying information from a potential service engineer, and communicate the identifying information to the device controller 240. The input means may comprise any of a keyboard, a touch-screen or GUI, a biometric scanner or input mechanism such as a fingerprint scanner, retina scanner, camera arrangement configured to scan a potential service engineer's face as part of a facial recognition system, or microphone arrangement configured to capture and assess/review a potential service engineer's voice as part of a voice recognition system. The input means may comprise means which allow information regarding a potential field service engineer's signature to be collected, for example the input means may comprise an electric pen and pad, or a similar system, which measures characteristics of the engineer's signature such as shape, size, and the pressure with which it is signed and inclination at which the pen is angled during the signature, etc, in accordance with known methods of signature analysis and authorisation.

In an example, each field service engineer (FSE) has their own portable processing device such as a laptop. The laptop may be provided by the service and repair company the FSE works for. The laptop is the input means, and may be connectable to the device controller 240, which is located at and coupled to the radiotherapy device. For example, the FSE laptop may be coupled to the device controller via a LAN or ethernet cable. Once coupled to the device controller, the FSE laptop may send a query to the device controller to determine the identity of the radiotherapy device. The radiotherapy device controller then sends back identifying information which identifies the radiotherapy device, for example the device's unique ID number. As will be explained in greater detail below, the FSE laptop or other processing device may store, or host, a dedicated access control application, which stores information relating to the access rights of the particular FSE.

Method from the 'Point of View' of the Cloud/Central Computer

Figure 5:
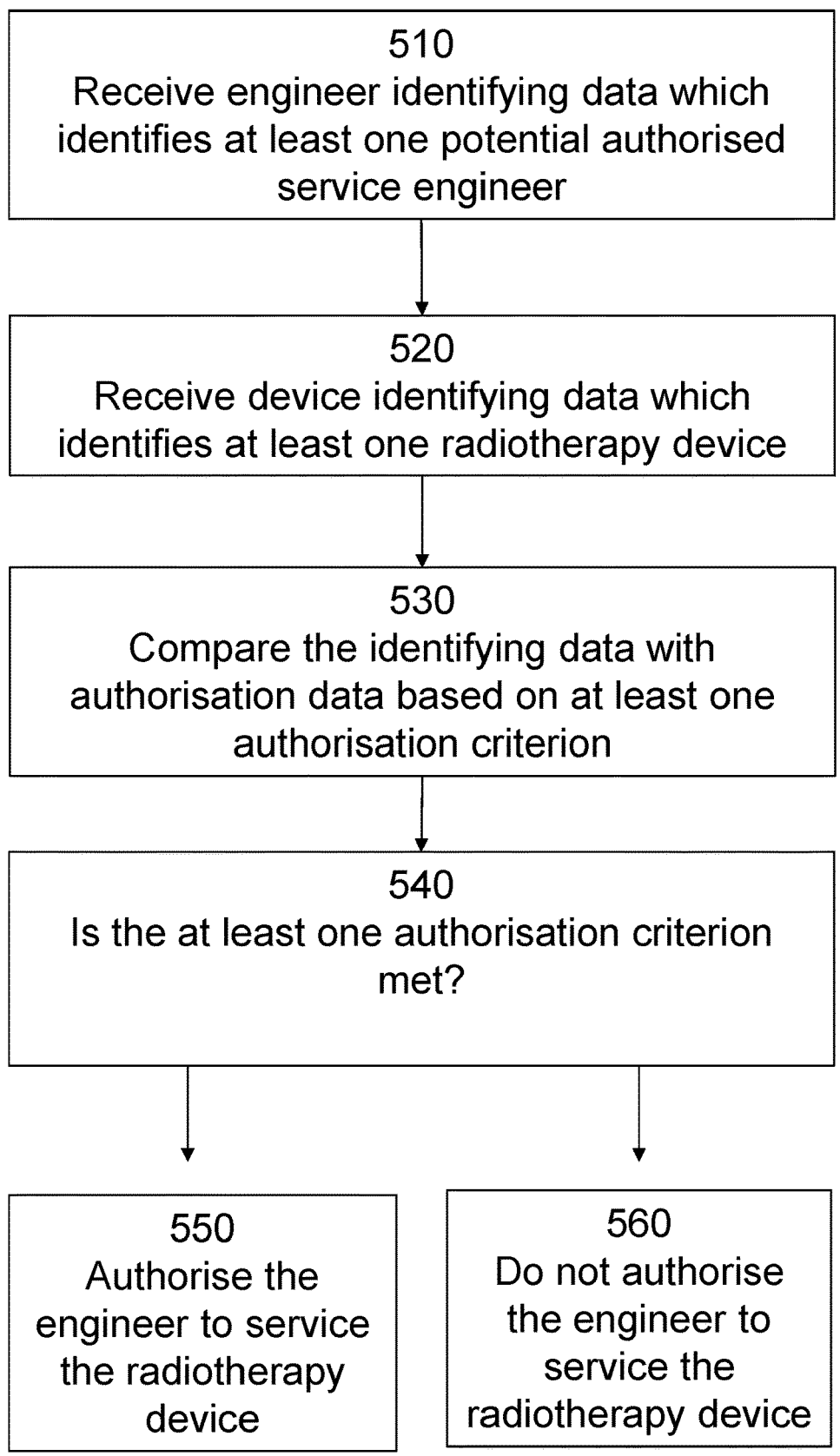
FIG. 5 depicts a method according to the present disclosure.

The flowchart of FIG. 5 depicts a method according to the present disclosure. The method is suitable for being carried out, for example, by the central controller 270. At step 510, engineer identifying data which identifies at least one potential service engineer is received. This data can be described as identifying data or identifying information, which identifies the at least one potential authorised service engineer. The identifying data may be received from a device controller 240 associated with a radiotherapy device 200, or directly from a processing device associated with the potential engineer themselves, for example their mobile device. The form and content of the identifying data depends on the input means being employed. The engineer identifying data is inputted, or provided, by the engineer via the input means. For example, in an implementation which employs the use of a keyboard or touch screen, the identifying data may comprise a user name and a password.

At step 520, device identifying data, or device identifying information, is received which identifies at least one radiotherapy device. This may comprise the device unique ID. The device identifying data may comprise the product name, type, age, repair and servicing status, and owner information. It should be noted that step 520 may be performed before step 510, or else this information may be provided to the central controller at the same time as part of the same query, communication or message.

At step 530, the identifying data is compared with authorisation data based on at least one authorisation criterion. The comparing may comprise querying, by the central controller 270, the authorisation database stored in central memory 275. At step 540, it is determined whether the at least one authorisation criterion is met. Steps 530 and 540 can be described as a determination of whether an authorisation criterion is met based on the engineer identifying data, the device identifying data, and the authorisation data.

The authorisation criterion is based on information stored in the authorisation database. The authorisation database may store any or all of the following information: information relating to the skills/training of each FSE, the hardware and software tools available for repairing each of a plurality of radiotherapy devices; manuals and other documentation which may be of use to the FSE when repairing radiotherapy devices; specific machine configuration information, for example based on the installed base information and/or which was uploaded at the time of installation of each device; the type of activity which is scheduled to be carried out on the machine, for example corrective, planned or preventive maintenance; optional or mandatory upgrade, or new installations; data of parts, both hardware and software, which have been changed or installed during historic site visits. This data will update the configuration of the machine as recorded in the Installed Base database; and the service contracts which relate to each machine.

The authorisation criterion may be based on any or all of the information stored in the authorisation database. The authorisation criterion may simply be that the engineer who is identified by the engineer identifying data should be listed in the authorisation database as being authorised to service the radiotherapy device identified by the device identifying data.

Each FSE may have an authorisation 'level'. The authorisation level assigned to a particular FSE may be based on any of the courses and training they have undertaken, their seniority and/or experience, the materials they have indicated they have read, as well as any of the other factors detailed above as being stored in the authorisation database. The authorisation level may be personalised for a particular FSE. The access rights granted to the FSE may depend on the FSE's authorisation level. For example, the ability to adjust operational parameters associated with particular machine components may be restricted based on the authorisation level.

If the authorisation criterion is met, the engineer is authorised to service the radiotherapy device at step 550. A notification, or communication, is sent to the device controller 240 that the service engineer is authorised to service the device. The notification may indicate particular, engineer-specific access rights. Authorising the engineer to service the radiotherapy device may comprise providing a stored or a one-time password and/or username to the engineer, either via the device controller or a portable processing device associated with the FSE, which gives particular access rights to the device controller. If a one-time password is generated, the password may be time limited, such that the FSE is authorised to have particular access rights for a limited time only, for example for that particular day. After this time, the FSE access rights expire and he or she must pass the authorisation check again.

If access is granted through a FSE's laptop or other portable processing device, the expiring of the access rights is controlled through the access control application on the laptop. Every so often the laptop re-establishes the connection with the authorizing software on the accessed machine.

Following this step, access may be granted to certain functionality at the device controller 240 based on the communicated access rights. In other words, access rights and/or permissions may be granted to the authorised service engineer. The access rights may comprise the ability to adjust parameters associated with operation of the radiotherapy device; for example the currents and power levels at or supplied to particular components of the radiotherapy device, the ability to adjust the alignment of the beam using beam alignment systems, etc. The access rights may comprise the ability to view and edit usage data associated with the components of the radiotherapy device. The access rights may comprise the ability to view and edit manuals and technical information regarding each component of the radiotherapy device.

As discussed elsewhere herein, the access rights granted to a FSE are determined by the products and skills of the particular FSE. Some radiotherapy devices may have a single level of service access right. However, some complex products, such as a Linac device, may have different levels of access, i.e different authorisation levels may be assigned to different FSEs. For example, calibration of the radiation energies is a very technical skill requiring considerable knowledge and training, and requires different training from replacing some other mechanical/electrical parts. By way of another example, example, service work relating to motors or potentiometers and associated geometrical calibration requires different skills than the replacement of a magnetron.

Alternatively, if the authorisation criterion is not met, the engineer is not authorised to service the radiotherapy machine at step 560. In this scenario, the above-mentioned certain access rights and/or permissions are not granted. In addition, the authorisation database may be updated to indicate that an unauthorised engineer attempted to access restricted information or functionality at the device controller 240.

In certain implementations, the authorisation database is updated with event data which indicates that someone attempted to service the radiotherapy device or access the device controller 240. The authorisation database may be updated with any of the following information for the identified radiotherapy device: the name of the service engineer, the time at which the engineer attempted to service, or access, the radiotherapy device, whether the attempt was successful, etc.

Figure 6:
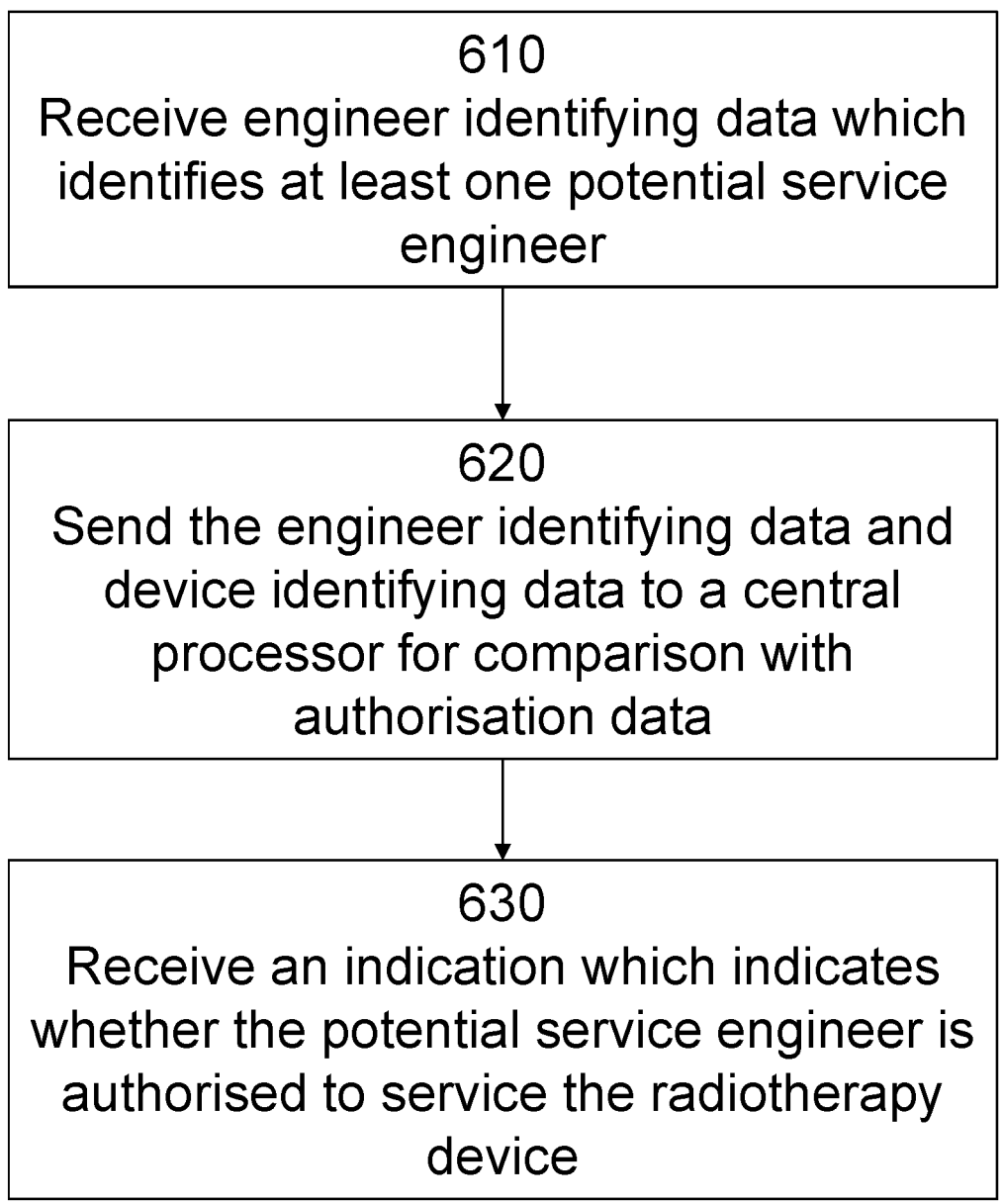
FIG. 6 depicts a method according to the present disclosure.

Method from the 'Point of View' of a Computer Located at the Radiotherapy Device The flowchart of FIG. 6 depicts a method in accordance with the present disclosure. The method is suitable to be carried out, for example, by a device controller 240 of a radiotherapy device 200, or by a combination of a dedicated mobile or portable device associated with the potential authorised service engineer and a device controller 240.

At step 610, data identifying at least one potential service engineer is received. The manner in which the data is received depends upon the particular implementation. For example, the engineer identifying data may be received from the input means. In an example in which the input means is a fingerprint scanner, the engineer identifying information is collected by the fingerprint scanner and communicated to the device controller 240.

At step 620, the engineer identifying information and device identifying data is sent to a central processor for comparison with authorisation data. In certain implementations, the device is associated with the particular radiotherapy device and this association is stored in device memory 245, meaning it can be supplied to the central processor automatically by the device controller 240. In other implementations, the device identifying data may be inputted, or provided, by the potential service engineer.

At step 630, an indication is received which indicates whether the potential service engineer is authorised to service, or access, the radiotherapy device. The indication may be received from the central processor 270 after it has been determined at step 540 whether the at least one safety criterion has been met. Following receipt of an indication that the engineer is authorised, and an indication of the access rights which should be granted to the identified service engineer, access rights and privileges are granted to the service engineer based on the notification.

Simple Example

In a simple example according to the flowchart of FIGS. 5 and 6, the engineer enters a username and password via a keyboard coupled to the computer associated with a particular radiotherapy device. The username and password may be provided by the device manufacturer, or else by a repair and service company authorised to provide repair services according to a service contract.

The username and password entered by the service engineer is received (step 610) at the device computer via the keyboard input means, and is communicated to a central server or computer (step 620). The device computer also communicates a unique ID associated with the radiotherapy device to the central server.

The server receives the username and password (step 510) and the unique ID (step 520) and determines whether the service engineer is authorised to service the radiotherapy machine based on information stored in the authorisation database (steps 530 and 540). For example, the authorisation database may indicate that the engineer has undertaken the proper courses and training and is therefore certified to service and repair all radiotherapy devices manufactured by the company which manufactured the identified radiotherapy device. Accordingly, the central processor determines that the engineer is authorised to service the device (step 550) and communicates to the device controller that the engineer should be granted full access rights and privileges. The device controller receives this communication, or indication (step 630), from the central processor and grants the engineer full access rights to service the radiotherapy device.

Disclosed methods are advantageous for several reasons. Manufacturers of radiotherapy devices and service and repair providers can ensure that only authorised service engineers can service machines by controlling access rights. For example, by ensuring that only authorised service engineers can adjust parameters associated with the operation of the device, it can be ensured that the device continues to operate in accordance with safety and regulatory requirements. The disclosed methods also allow owners of radiotherapy devices, such as hospitals, to make more informed decisions about the servicing of their machines, for example by ensuring that they hire only properly certified and trained service engineers to repair and service their radiotherapy devices.

An Offline Implementation

In a further disclosed implementation, each FSE has their own portable processing device, such as a laptop, computer, mobile phone or tablet. A dedicated access control application is installed on the processing device. Communication between the portable processing device and the device controller may mean that real-time communication with a central server or database is not necessary.

The access control application stores authorisation data. The authorisation data may comprise information relating to the FSE's access rights, for example the FSE's rights to log in to device controllers associated with particular radiotherapy devices and/or the FSE's right to adjust and view particular data and functionalities associated with the radiotherapy device. The authorisation data may comprise any authorisation data discussed above, for example data relating to which materials the FSE has downloaded onto their processing device, such as whether the FSE has downloaded the latest manual, knowledge article or software tool. As described above, the authorisation data may comprise certificates awarded to the engineer indicating that he/she has the skills to perform particular pieces of repair and maintenance work.

The application could support an off-line workflow in case the radiotherapy device site has no connection to the internet. This may be the case when hospitals have strict policies or where internet access is unreliable, or when the radiotherapy device is installed on a military site. Also, WiFi is not typically available in the treatment room. It is also beneficial to have an offline workflow as a safety back-up, for example to allow the FSE to access a device controller and repair a device when the internet at a particular site is unreliable or otherwise not working.

The method of FIG. 5 may also be carried out by a portable processing device associated with, e.g. owned by, a FSE. At step 510, the portable processing device receives identifying data which identifies at least one potential authorised service engineer. This may be a username and password, or other information as described above. Alternatively, the application may retrieve engineer identifying data from a local memory. The engineer identifying data may be referred to as access credentials. The engineer identifying data may also comprise a date and/or time at which the access credentials were last verified by the central database.

At step 520, device identifying information or data is received. This device identifying data may be obtained via the device controller. In an example, the FSE connects or couples the portable processing device to the device controller, for example via a LAN or ethernet cable, and the access control application queries the device controller and receives information pertaining to the identity of the radiotherapy device.

At step 530, the received identifying data is compared with authorisation data based on an authorisation criterion in a similar manner to that described above. However, rather than being performed by a central processor or server, the authorisation check is carried out by the dedicated access control application, and the authorisation data is stored locally, in memory accessible by the access control application.

In some examples, the portable processing device first checks whether internet access is available, if it is, then the engineer identifying data and device identifying data is sent to a central processor for comparison with authorisation data as described above with respect to step 620 of the flowchart of FIG. 6. If internet access is not available, then the process proceeds locally, i.e. the authorisation data stored locally is consulted.

In some examples, the access control application regularly communicates with the central database in order to update the authorisation data stored locally on the portable processing device. The portable processing device is associated with a particular FSE, and therefore authorisation information related to that FSE is downloaded and stored in the local memory accessible by the portable processing device. In an example, the portable processing device may perform a regular for example a daily, 'check-in' with the central controller. The regular check-in ensures that the authorisation data stored locally is correct when compared to the authorisation data stored in the central authorisation database. If the centrally stored authorisation data has been updated, then the update is downloaded and stored locally at the FSE's portable processing device.

In further examples, the method depicted in FIG. 5 comprises an optional additional step of checking whether a time criterion associated with the locally stored authorisation data is met. For example, if it is determined that the authorisation data stored locally at the portable processing device has not been updated with the central database within a time period, then access is not granted to the FSE and the FSE is not authorised to service the radiotherapy machine. The time period, which may be described as a time threshold, may be a week or a particular number of days, for example.

The above described authorisation checks prevent former FSEs gaining access to device controllers when, for example, their employment has ended. The time threshold acts to ensure that people cannot seek to circumvent authorisation checks using portable processing devices with out of date authorisation data. The time period also acts to ensure that FSEs have access to the latest and most up to date service information. For example, if a new diagnostic test, a new fix, or new safety information is available about a particular radiotherapy device or one of its components, a combination of the proper authorisation checks and time periods will ensure that FSEs have read the relevant materials and updated their training accordingly. Also, some training and certifications acquired by FSEs are time limited and thus may lapse unless the FSE regularly updates their knowledge and training. For example, if a FSE's certification that he or she is authorised to carry out beam calibration has expired, this will be updated at the central database. In implementations where the central database is consulted in real time as the calibration is about to be carried out, the FSE will fail the authorisation check at step 540 and will not be granted access rights, ie. will be deemed to be not authorised to service the radiotherapy machine. If a real-time check is not possible due to the lack of internet, the authorisation data stored in the FSE's portable processing device will be consulted. Because the authorisation data stored therein is regularly updated with the central database, the locally stored authorisation data will be up to date within a threshold defined by the threshold time period.

The access control application may have other uses. For example, the application can store and update a range of software and manuals released electronically. The application manages these electronic tools (software, manuals and knowledge articles) and ensures these are up to date by syncing and communicating with the central processor.

In an example, an FSE may be prevented from accessing a machine or some of its functionalities if the latest manual, knowledge article or software tool has not been downloaded by the engineer. The application may also manage hardware tools like measuring devices that need periodic calibration. These tools could be identified by a bar or QR code readable via phone or other, for example via a component or hardware tool identifier in a manner similar or identical to that described above in relation to radiotherapy device component identifiers. In short, the application stored on the FSE's laptop may hold a database of available hardware and software tools, manuals and knowledge articles that the engineer should use in doing certain tasks. The database should also hold the certificates awarded to the engineer indicating that he/she has the skills to perform the work. If the FSE does not have up to date software or hardware tools, or does not have the relevant certification or training for the service that is scheduled to be carried out, they are not granted access rights to the device.

In an example of additional functionality, time expiring password may be granted by a dedicated help-desk in emergency cases where the laptop cannot connect with the authorizing software on the machine for any reason.

Two- or Multi-Factor Authentication

The present disclosures may also comprise an element of multi-factor authentication. This may be achieved via the combination of multiple portable processing devices associated with a particular FSE, for example a mobile phone and a laptop. In such an example, a FSE must present two factors (i.e. pieces of evidence) before access is granted and they are authorised to service the radiotherapy device.

In a disclosed example, and with reference to FIGS. 5 and 6, a field service engineer is authorised at step 550 following the input of identifying information via an input means and/or his laptop. However, as part of a multi-factor authentication mechanism, the central processor may additionally send a communication to the FSE's mobile device. This communication may be an SMS or other text-based message, instant message, or email. The communication provides 'one-time' log in details, which may comprise a username and password. This one-time password expires after a certain amount of time. This one-time password must then be provided to the device controller before access rights are granted to the FSE. In this manner, multi-factor authentication is provided: the person requesting access to the device controller has provided a first factor (e.g. I have the laptop associated with an authorised FSE and/or I was able to provide identifying information associated with an authorised FSE through the input means) and also a second factor (I have access to the mobile device associated with an authorised FSE).

Disclosed herein is a method of determining whether a service engineer is authorised to repair or service a radiotherapy device, the radiotherapy device comprising a linear accelerator and being configured to provide therapeutic radiation to a patient. The method comprises receiving data identifying at least one service engineer; determining, based on the engineer identifying data and authorisation data, whether at least one authorisation criterion is met; and if the at least one authorisation criterion is met, authorising the service engineer to repair or service the radiotherapy device. Authorising the service engineer to repair or service the radiotherapy device may comprise providing log-in details which allow the service engineer to access a device controller, the device controller being configured to store data pertaining to the operation of the radiotherapy device and being configured to control operation of the radiotherapy device.

The approaches described herein may be embodied on a computer-readable medium, which may be a non-transitory computer-readable medium. The computer-readable medium carrying computer-readable instructions arranged for execution upon a processor so as to make the processor carry out any or all of the methods described herein.

The term "computer-readable medium" as used herein refers to any medium that stores data and/or instructions for causing a processor to operate in a specific manner. Such storage medium may comprise non-volatile media and/or volatile media. Non-volatile media may include, for example, optical or magnetic disks. Volatile media may include dynamic memory. Exemplary forms of storage medium include, a floppy disk, a flexible disk, a hard disk, a solid state drive, a magnetic tape, or any other magnetic data storage medium, a CD-ROM, any other optical data storage medium, any physical medium with one or more patterns of holes, a RAM, a PROM, an EPROM, a FLASH-EPROM, NVRAM, and any other memory chip or cartridge.

The following numbered clauses are disclosed herein:

1. A method of determining whether a radiotherapy device should be authorised for use, wherein the device is configured to provide therapeutic radiation to a patient, the method comprising receiving data identifying at least one component of the radiotherapy device; determining whether at least one authorisation criterion is met by comparing the identifying data with authorisation data; and if the at least one authorisation criterion is met, determining that the radiotherapy device is authorised for use.

2. A method of determining whether a radiotherapy device should be authorised for use, wherein the device is configured to provide therapeutic radiation to a patient, the method comprising receiving data identifying at least one component of the radiotherapy device; sending the identifying data to a central processor for comparison with authorisation data; and receiving an indication which indicates whether the radiotherapy device is authorised for use.

3. The method of clause 1 or clause 2, wherein the at least one component comprises at least one identifier configured to provide the data identifying the at least one component.

4. The method of clause 3, wherein the at least one identifier is one of a passive RFID tag, an active RFID tag, an optical mark, or a physical mark.

5. The method of any preceding clause, wherein the comparison of identifying data with authorisation data comprises checking that the at least one component identified in the identifying data is listed as being authorised for use with the radiotherapy device in an authorisation database.

6. The method of any preceding clause, wherein receiving data identifying at least one component of the radiotherapy device comprises receiving identifying information from each respective component of a plurality of components of the radiotherapy device.

7. The method of any preceding clause, further comprising if the at least one authorisation criterion is not met, determining that the radiotherapy device is not authorised for use.

8. The method of clause 7, wherein, in response to determining that the radiotherapy device is not authorised, the method further comprises at least one of: sending an indication which indicates that the device is not authorised to the device owner, sending an indication which indicates that the device is not authorised to the device manufacturer, and updating an authorisation database to indicate that the device is not authorised for use.

9. A system comprising a radiotherapy device configured to provide therapeutic radiation to a patient, and a device processor having a device memory, the device processor communicatively coupled to a central processor, the device processor having computer executable instructions which, when executed by the device processor, cause the device processor to perform the method of any preceding clause.

10. The system of clause 9, further comprising an RFID tag interrogator.

11. A method of determining whether a field service engineer is authorised to repair and/or service a radiotherapy device, the method comprising: receiving engineer identifying data which identifies at least one potential authorised field service engineer; receiving device identifying data which identifies at least one radiotherapy device; comparing the engineer identifying data and the device identifying data with authorisation data; determining whether an authorisation criterion is met based on the comparison; and if the at least one authorisation criterion is met, determining that the potential authorised field service engineer is authorised to repair and/or service the radiotherapy device.

12. A method of determining whether a field service engineer is authorised to repair and/or service a radiotherapy device, the method comprising receiving engineer identifying data which identifies at least one potential authorised field service engineer; sending the engineer identifying data and device identifying data to a central processor for comparison with authorisation data; receiving an indication which indicates whether the potential field service engineer is authorised to repair and/or service the radiotherapy device.

The above implementations have been described by way of example only, and the described implementations and arrangements are to be considered in all respects only as illustrative and not restrictive. It will be appreciated that variations of the described implementations and arrangements may be made without departing from the scope of the invention.

The invention claimed is:

1. A computer-implemented method of determining whether a radiotherapy device configured to provide therapeutic radiation to a patient should be authorized for use, the device comprising one or more components, each component of the one or more components being coupled with at least one identifier configured to provide data identifying the component it is coupled with; the method comprising:

receiving, from the at least one identifier, data identifying each of the one or more components of the radiotherapy device;

determining whether at least one authorization criterion is met based on the identifying data and authorization data;

in response to determining that the at least one authorization criterion is met, determining that the radiotherapy device is authorized for use;

maintaining a data log to store the received data identifying each component of the one or more components;
receiving data identifying a newly installed component of the radiotherapy device from an identifier coupled with the newly installed component;
determining that the newly installed component has been newly installed based on the received identifying data and data stored in the data log;
determining whether the at least one authorization criterion is met based on the identifying data received from the newly installed component and the authorization data;
in response to determining the at least one authorization criterion is met based on the identifying data received from the newly installed component and the authorization data, determining that the radiotherapy device is authorized for use, wherein each identifier of the at least one identifier comprises a power supply and an active transmitter configured to repeatedly transmit the data identifying the component, wherein the radiotherapy device comprises a receiver to receive one or more signals from the active transmitter, wherein a location of each of the one or more components is derived from the data log based on a strength of signals received at the receiver;
determining a signal strength when receiving data identifying a component from the active transmitter;
logging the signal strength and the received identifying data in the data log; and
in response to determining that the radiotherapy device is not authorized for use, causing the radiotherapy device to stop or shut down.

2. The method of claim 1, wherein the at least one identifier is one of a passive RFID tag, an active RFID tag, an optical mark, or a physical mark.

3. The method of claim 1, wherein determining whether at least one authorization criterion is met comprises checking that each of the one or more components identified by the identifying data is listed as being authorized for use with the radiotherapy device in an authorization database.

4. The method of claim 1, further comprising:
in response to determining that the at least one authorization criterion is not met, determining that the radiotherapy device is not authorized for use.

5. The method of claim 4, wherein, in response to determining that the radiotherapy device is not authorized, the method further comprises at least one of:
sending an indication which indicates that the device is not authorized to a device owner,
sending an indication that the device is not authorized to a device manufacturer, and
updating an authorization database to indicate that the device is not authorized for use.

6. The method of claim 1, wherein the radiotherapy device comprises a second receiver to receive one or more signals from the active transmitter, wherein maintaining the data log comprises logging a signal strength of the identifying data received at the receiver and the second receiver, and wherein the location of the component can be determined in at least two coordinate axes.

7. The method of claim 1, wherein the authorization data comprises an expected location of at least one of the one or more components, and wherein the at least one authorization criterion comprises a distance threshold such that determining whether the at least one authorization criterion is met comprises comparing the determined location of a component to the expected location of the component based on the distance threshold.

8. The method of claim 1, further comprising providing, in response to a user request, a last-known location of one or more components of the one or more components.

9. The method of claim 1, further comprising:
connecting the power supply of each identifier of the at least one identifier with a device power source;
determining that a particular component of the one or more components has been disconnected from the device power source; and
continuing to receive identifying data and log the signal strength and the received identifying data in the data log.

10. The method of claim 1, further comprising:
deriving from the data log a duration of instalment of each of the one or more components, wherein the authorization data comprises an operational lifetime of at least one of the one or more components, and wherein the at least one authorization criterion comprises an instalment time threshold wherein determining whether the at least one authorization criterion is met comprises comparing the duration of instalment to the operational lifetime based on the instalment time threshold.

11. A computer-implemented method of determining whether a radiotherapy device configured to provide therapeutic radiation to a patient should be authorized for use, the device comprising one or more components, each component of the one or more components being coupled with at least one identifier configured to provide data identifying the component it is coupled with, the method comprising:
receiving, from the at least one identifier, data identifying each of the one or more components of the radiotherapy device;
sending the identifying data to a central processor to determine whether at least one authorization criterion is met based on the identifying data and authorization data;
receiving an indication which indicates whether the radiotherapy device is authorized for use;
maintaining a data log to store the received data identifying each component of the one or more components;
receiving data identifying a newly installed component of the radiotherapy device from an identifier coupled with the newly installed component;
determining that the newly installed component has been newly installed based on the received identifying data and data stored in the data log;
determining whether the at least one authorization criterion is met based on the identifying data received from the newly installed component and the authorization data;
in response to determining the at least one authorization criterion is met based on the identifying data received from the newly installed component and the authorization data, determining that the radiotherapy device is authorized for use, wherein each identifier of the at least one identifier comprises a power supply and an active transmitter configured to repeatedly transmit the data identifying the component, wherein the radiotherapy device comprises a receiver to receive one or more signals from the active transmitter;
determining a signal strength when receiving data identifying a component from the active transmitter;
logging the signal strength and the received identifying data in the data log; and in response to determining that the radiotherapy device is not authorized for use, causing the radiotherapy device to stop or shut down.

12. The method of claim 11, wherein the at least one identifier is one of a passive RFID tag, an active RFID tag, an optical mark, or a physical mark.

13. The method of claim 11, further comprising:
maintaining a data log to store the received data identifying each component of the one or more components.

14. The method of claim 11, further comprising:
deriving from the data log a duration of instalment of each of the one or more components, wherein the authorization data comprises an operational lifetime of at least one of the one or more components, and wherein the at least one authorization criterion comprises an instalment time threshold wherein determining whether the at least one authorization criterion is met comprises comparing the duration of instalment to the operational lifetime based on the instalment time threshold.

15. A radiotherapy device configured to provide therapeutic radiation to a patient, the device comprising:
one or more components, each component of the one or more components being coupled with at least one identifier, wherein the at least one identifier provides data identifying a particular component that the at least one identifier is coupled with; and
a device processor coupled to a device memory storing computer executable instructions which, when executed by the device processor, cause the device processor to perform operations comprising:
receiving, from the at least one identifier, data identifying each component of the one or more components of the radiotherapy device;
determining whether at least one authorization criterion is met based on the identifying data and authorization data;
responsive to determining that the at least one authorization criterion is met, determining that the radiotherapy device is authorized for use;
maintaining a data log to store the received data identifying each component of the one or more components;
receiving data identifying a newly installed component of the radiotherapy device from an identifier coupled with the newly installed component;
determining that the newly installed component has been newly installed based on the received identifying data and data stored in the data log;
determining whether the at least one authorization criterion is met based on the identifying data received from the newly installed component and the authorization data;
in response to determining the at least one authorization criterion is met based on the identifying data received from the newly installed component and the authorization data, determining that the radiotherapy device is authorized for use, wherein each identifier of the at least one identifier comprises a power supply and an active transmitter configured to repeatedly transmit the data identifying the component, and wherein the radiotherapy device comprises a receiver to receive one or more signals from the active transmitter, wherein a location of each of the one or more components is derived from the data log based on a strength of signals received at the receiver;
determining a signal strength when receiving data identifying a component from the active transmitter;
logging the signal strength and the received identifying data in the data log; and
in response to determining that the radiotherapy device is not authorized for use, causing the radiotherapy device to stop or shut down.

16. The device of claim 15, the radiotherapy device further comprising:
at least one additional receiver.

17. The device of claim 16, wherein the receiver is an RFID tag interrogator.

18. The radiotherapy device of claim 15, wherein the operations further comprise:
deriving from the data log a duration of instalment of each of the one or more components, wherein the authorization data comprises an operational lifetime of at least one of the one or more components, and wherein the at least one authorization criterion comprises an instalment time threshold wherein determining whether the at least one authorization criterion is met comprises comparing the duration of instalment to the operational lifetime based on the instalment time threshold.

* * * * *